US011423866B2

(12) United States Patent
Park et al.

(10) Patent No.: US 11,423,866 B2
(45) Date of Patent: Aug. 23, 2022

(54) METHOD FOR DISPLAYING CONTENT OF APPLICATION VIA DISPLAY, AND ELECTRONIC DEVICE

(71) Applicant: Samsung Electronics Co., Ltd., Gyeonggi-do (KR)

(72) Inventors: Hyunjun Park, Gyeonggi-do (KR); Harksang Kim, Gyeonggi-do (KR); Taemoon Roh, Gyeonggi-do (KR); Donghwy Kim, Gyeonggi-do (KR); Hanyuool Kim, Gyeonggi-do (KR); Jongkon Bae, Gyeonggi-do (KR); Hongkook Lee, Gyeonggi-do (KR); Dongkyoon Han, Gyeonggi-do (KR)

(73) Assignee: Samsung Electronics Co., Ltd ( * ) Notice: Subject to any disclaimer, the term of this patent is extended or adjusted under 35 U.S.C. 154(b) by 0 days.

(21) Appl. No.: 17/058,855

(22) PCT Filed: May 27, 2019

(86) PCT No.: PCT/KR2019/006310
§ 371 (c)(1),
(2) Date: Nov. 25, 2020

(87) PCT Pub. No.: WO2019/226025
PCT Pub. Date: Nov. 28, 2019

(65) Prior Publication Data
US 2021/0225331 A1    Jul. 22, 2021

(30) Foreign Application Priority Data
May 25, 2018   (KR) ......................... 10-2018-0059906

(51) Int. Cl.
G09G 5/38      (2006.01)
G06F 3/041     (2006.01)
(Continued)

(52) U.S. Cl.
CPC ............... *G09G 5/38* (2013.01); *G06F 3/041* (2013.01); *G09G 5/14* (2013.01); *G09G 5/373* (2013.01);
(Continued)

(58) Field of Classification Search
CPC ............ G09G 5/38; G09G 5/14; G09G 5/373; G09G 5/377; G09G 3/3208; G09G 3/20;
(Continued)

(56) References Cited

U.S. PATENT DOCUMENTS

2005/0212726 A1   9/2005  Namba et al.
2008/0252666 A1  10/2008  Chen et al.
(Continued)

FOREIGN PATENT DOCUMENTS

EP       3480805        5/2019
KR       20080092581    10/2008
(Continued)

OTHER PUBLICATIONS

European Search Report dated May 25, 2021 issued in counterpart application No. 19806951.0-1210, 20 pages.
(Continued)

*Primary Examiner* — Brent D Castiaux
(74) *Attorney, Agent, or Firm* — The Farrell Law Firm, P.C.

(57) ABSTRACT

An electronic device according to various embodiments may comprise: a display panel having an active area of a first designated size; and a processor. The processor may be configured to: run a designated application comprising a first application display layer set to display fixed content, and a second application display layer set to display changing content; and, while the designated application is running, and on the basis of at least the fixed content, display the first application display layer in a second designated size smaller
(Continued)

than the first designated size, and at least temporarily move, within the active area, the first application display layer displayed in the second designated size.

13 Claims, 21 Drawing Sheets

(51) Int. Cl.
*G09G 5/373* (2006.01)
*G09G 5/377* (2006.01)
*G09G 5/14* (2006.01)
G09G 3/3208 (2016.01)

(52) U.S. Cl.
CPC ........... *G09G 5/377* (2013.01); *G09G 3/3208* (2013.01); *G09G 2320/046* (2013.01); *G09G 2320/08* (2013.01); *G09G 2320/10* (2013.01); *G09G 2340/12* (2013.01); *G09G 2354/00* (2013.01); *G09G 2360/144* (2013.01)

(58) Field of Classification Search
CPC ............... G09G 3/32; G09G 2320/046; G09G 2320/08; G09G 2320/10; G09G 2320/0257; G09G 2320/048; G09G 2340/12; G09G 2340/0464; G09G 2340/125; G09G 2340/10; G09G 2354/00; G09G 2360/144; G09G 2330/04; G06F 3/041; G06F 3/1423; G06F 3/04886; G06F 3/0481; G06F 3/04842
See application file for complete search history.

(56) References Cited

U.S. PATENT DOCUMENTS

| | | | |
|---|---|---|---|
| 2014/0049566 A1* | 2/2014 | Sudou | G09G 5/38 345/681 |
| 2017/0185248 A1* | 6/2017 | Lee | G06F 3/0486 |
| 2017/0336851 A1 | 11/2017 | Bae et al. | |
| 2018/0068603 A1* | 3/2018 | Noh | G09G 3/2092 |
| 2018/0075806 A1 | 3/2018 | Yamazaki et al. | |
| 2019/0179487 A1 | 6/2019 | Kong et al. | |

FOREIGN PATENT DOCUMENTS

| | | |
|---|---|---|
| KR | 20170076489 | 7/2017 |
| KR | 20170131072 | 11/2017 |
| KR | 20180014625 | 2/2018 |
| KR | 20180020544 | 2/2018 |

OTHER PUBLICATIONS

PCT/ISA/210 Search Report issued on PCT/KR2019/006310, dated Sep. 10, 2019, pp. 5.
PCT/ISA/237 Written Opinion issued on PCT/KR2019/006310, dated Sep. 10, 2019, pp. 9.
European Search Report dated Aug. 25, 2021 issued in counterpart application No. 19806951.0-1210, 19 pages.

* cited by examiner

METHOD FOR DISPLAYING CONTENT OF APPLICATION VIA DISPLAY, AND ELECTRONIC DEVICE

PRIORITY

This application is a National Phase Entry of International Application No. PCT/KR2019/006310, which was filed on May 27, 2019, and claims priority to Korean Patent Application No. 10-2018-0059906, filed in the Korean Intellectual Property Office on May 25, 2018, the entire content of each of which is incorporated herein by reference.

TECHNICAL FIELD

The disclosure relates to an electronic device which displays the content of an application via a display, and a method therefor.

BACKGROUND ART

Electronic devices such as a smartphone, a tablet personal computer (PC), a smart watch, and the like may display various content, such as images, text, and the like, on a display panel. The display panel may operate by a display driving circuit.

The display driving circuit may display a user interface of an application using each of a plurality of pixels of the display panel.

DISCLOSURE OF INVENTION

Technical Problem

In the case of an organic light emitting diodes (OLED) display, if the same screen is continuously displayed, the performance of a pixel may deteriorate due to the characteristics of elements and the burn-in phenomenon that makes an afterimage on a display may occur.

The technical subject matter of the document is not limited to the above-mentioned technical subject matter, and other technical subject matters which are not mentioned may be understood by those skilled in the art based on the following description.

Solution to Problem

In accordance with an aspect of the disclosure, an electronic device may include: a display panel having an active area in a first predetermined size; and a processor, wherein the processor is configured to: execute a predetermined application including a first application display layer configured to display fixed content and a second application display layer configured to display variable content; display, based at least on the fixed content, the first application display layer in a second predetermined size smaller than the first predetermined size, while the predetermined application is executed; and at least temporarily move the first application display layer displayed in the second predetermined size within the active area.

In accordance with an aspect of the disclosure, an electronic device may include: a display panel; and a processor, wherein the processor is configured to: execute a predetermined application including a first application display layer configured to display fixed content, and a second application display layer configured to display variable content; adjust a display property corresponding to a predetermined color included in at least a part of the first application display layer, based at least on the fixed content, while the predetermined application is executed; and display the fixed content included in the first application display layer of which the display property is adjusted and the variable content included in the second application display layer, via the display panel.

In accordance with an aspect of the disclosure, an electronic device may include: a display panel including an active area in a first predetermined size and a processor configured to display content via a first display layer and a second display layer, wherein the processor may be configured to: execute a predetermined application via the second display layer set to a second predetermined size smaller than the first predetermined size; display the first display layer having the first predetermined size in a predetermined color below the second display layer based on the execution; and at least temporarily move the second display layer set to the second predetermined size within the first display layer.

In accordance with an aspect of the disclosure, an electronic device may include a memory storing instructions, a display panel, and at least one processor operatively coupled to the display panel and the memory, wherein, when the instructions are executed, the at least one processor is configured to: receive an input for executing a first application among a plurality of applications stored in the electronic device; reduce the size of at least one layer among a plurality of layers that are configured in a user interface of the first application, based at least on the reception; represent the at least one layer having the reduced size in a first area in a display area of the display; and move the at least one layer among the plurality of layers in response to identifying that a predetermined (specified) period of time elapses from the timing at which the at least one layer is represented in the first area, so as to provide the at least one layer having the reduced size in a second area of the display area which partially overlaps with the first area.

In accordance with an aspect of the disclosure, an electronic device may include: a memory storing instructions; a display panel; and at least one processor operatively coupled to the display panel and the memory, wherein, when the instructions are executed, the at least one processor is configured to: identify a screen brightness in response to reception of an input for executing an application; display a user interface of the application in a first size in response to identifying that the screen brightness is lower than or equal to a reference brightness; and display the user interface of the application in a second size smaller than the first size in response to identifying that the screen brightness is higher than the reference brightness, and wherein the user interface displayed in the second size is moved at predetermined intervals.

In accordance with an aspect of the disclosure, a method of operating an electronic device may include: executing a predetermined application including a first application display layer configured to display fixed content and a second application display layer configured to display variable content; displaying, based at least on the fixed content, the first application display layer in a second predetermined size smaller than the first predetermined size, while the predetermined application is executed; and at least temporarily moving the first application display layer displayed in the second predetermined size, within the active area.

In accordance with an aspect of the disclosure, a method of operating an electronic device may include: executing a predetermined application including a first application display layer configured to display fixed content and a second application display layer configured to display variable content; adjusting a display property corresponding to a predetermined color included in at least a part of the first application display layer based at least on the fixed content, while the predetermined application is executed; and displaying the fixed content included in the first application display layer of which the display property is adjusted and the variable content included in the second application display layer via the display panel.

In accordance with an aspect of the disclosure, a method of operating an electronic device may include: executing a predetermined application via a second display layer, which is configured to have a second predetermined size smaller than a first predetermined size; displaying a first display layer having the first predetermined size in a predetermined color below the second display layer, based on the execution; and at least temporarily moving the second display layer configured to have the second predetermined size, within the first display layer.

In accordance with an aspect of the disclosure, a method of operating an electronic device may include: receiving an input for executing a first application among a plurality of applications stored in the electronic device; reducing the size of at least one layer among a plurality of layers that are configured in a user interface of the first application, based at least on the reception; representing the at least one layer having the reduced size in a first area in a display area of the display; and moving the at least one layer among the plurality of layers in response to identifying that a predetermined (specified) period of time elapses from the timing at which the at least one layer is represented in the first area, so as to represent the at least one layer having the reduced size in a second area of the display area which partially overlap with the first area.

In accordance with an aspect of the disclosure, a method of operating an electronic device may include: identifying a screen brightness in response to receiving an input for executing an application; displaying a user interface of the application in a first size in response to identifying that the screen brightness is lower than or equal to a reference brightness; and displaying the user interface of the application in a second size smaller than the first size in response to identifying that the screen brightness is higher than the reference brightness, wherein the user interface displayed in the second size may be moved at predetermined intervals.

Advantageous Effects of Invention

An electronic device including an organic light emitting diodes (OLED) display and a method therefor according to various embodiments may change display of a user interface so as to reduce the occurrence of the burn-in phenomenon in the OLED display.

Effects that could be obtained based on the disclosure are not limited to the above-described effects, and those skilled in the art would be clearly understand other effects which are not mentioned above, based on the descriptions provided below.

BEST MODE FOR CARRYING OUT THE INVENTION

Figure 1:
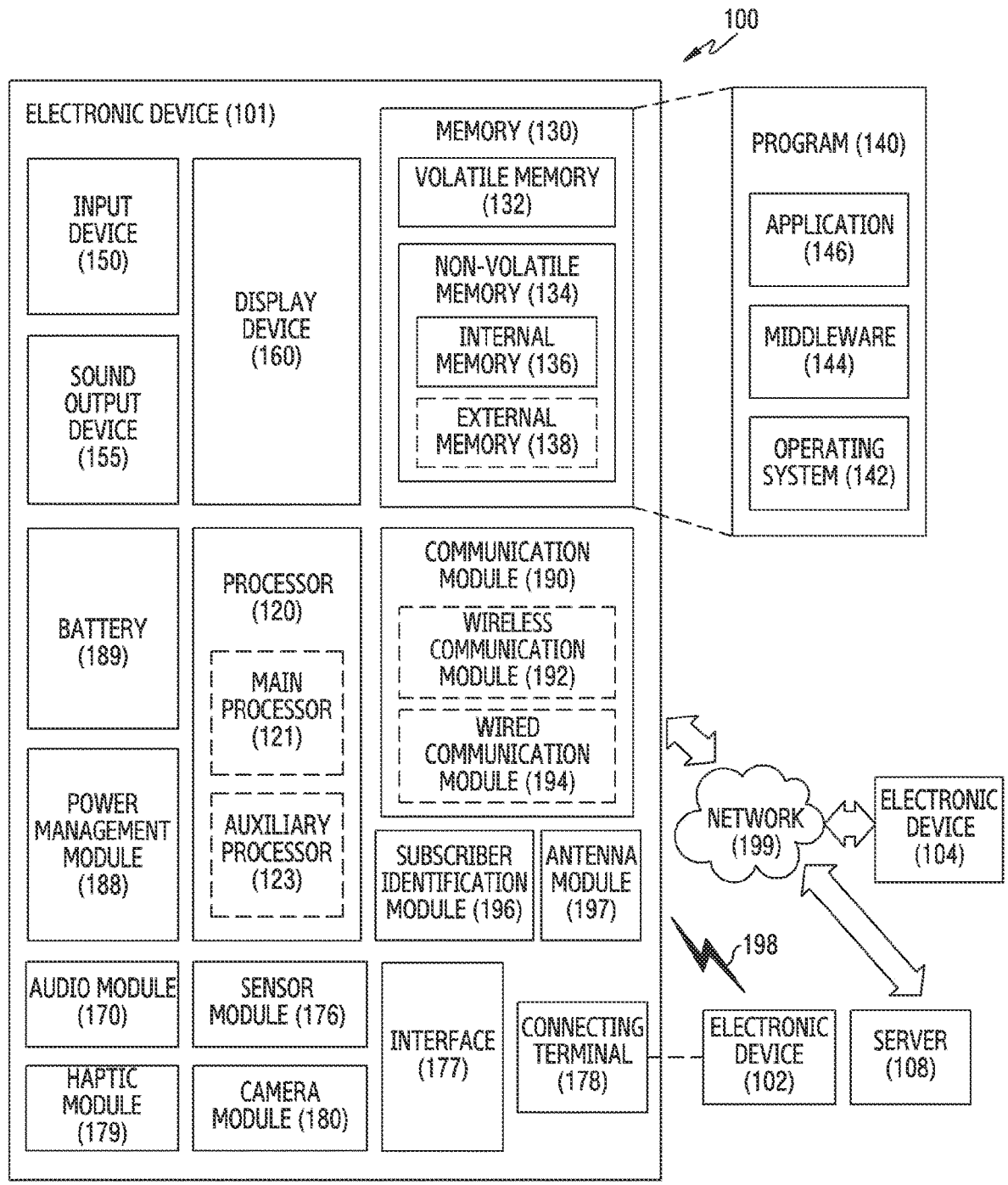
FIG. 1 is a block diagram of an electronic device, which controls display of a user interface, in a network environment according to various embodiments.

FIG. 1 is a block diagram of an electronic device, which controls display of a user interface, in a network environment according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
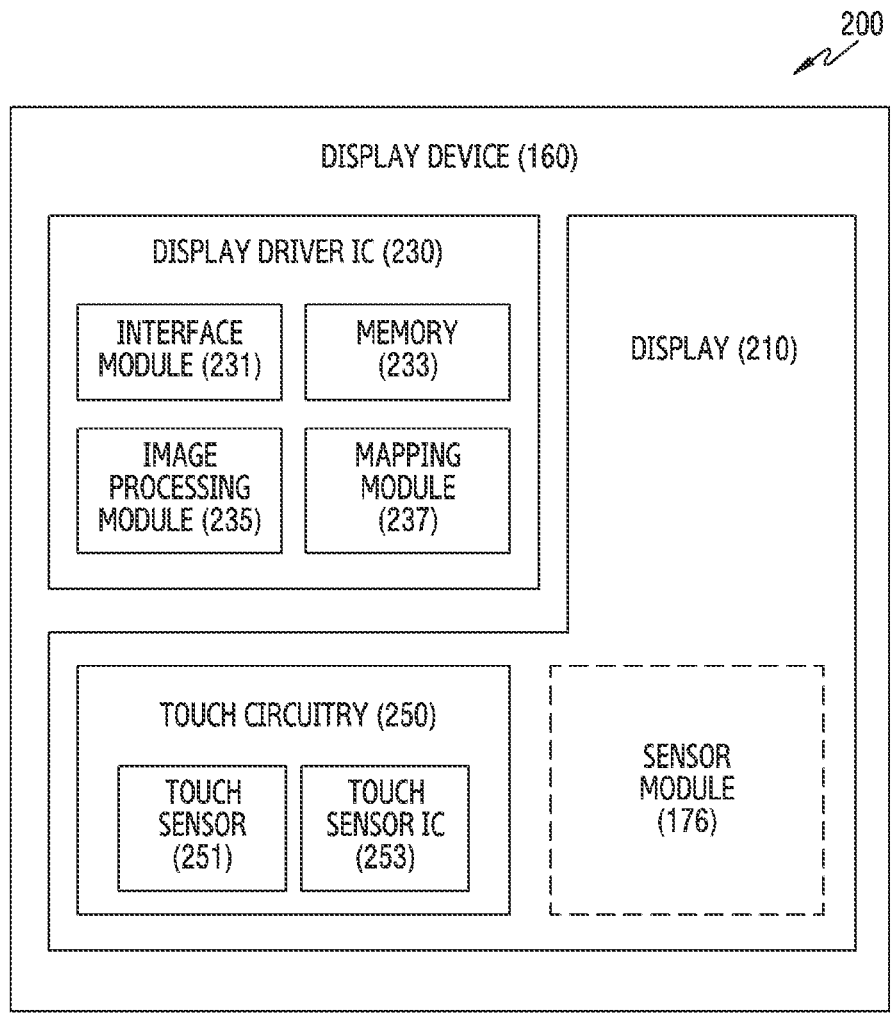
FIG. 2 is a block diagram of a display device which controls display of a user interface, according to various embodiments.

FIG. 2 is a block diagram of a display device which controls display of a user interface, according to various embodiments. Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
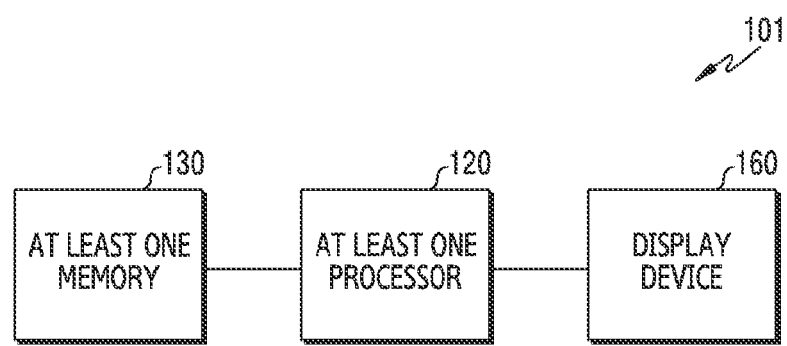
FIG. 3 is a diagram illustrating an example of the functional configuration of an electronic device according to various embodiments.

FIG. 3 is a diagram illustrating an example of the functional configuration of an electronic device according to various embodiments. The functional configuration may be included in the electronic device 101 illustrated in FIG. 1.

Figure 4A:
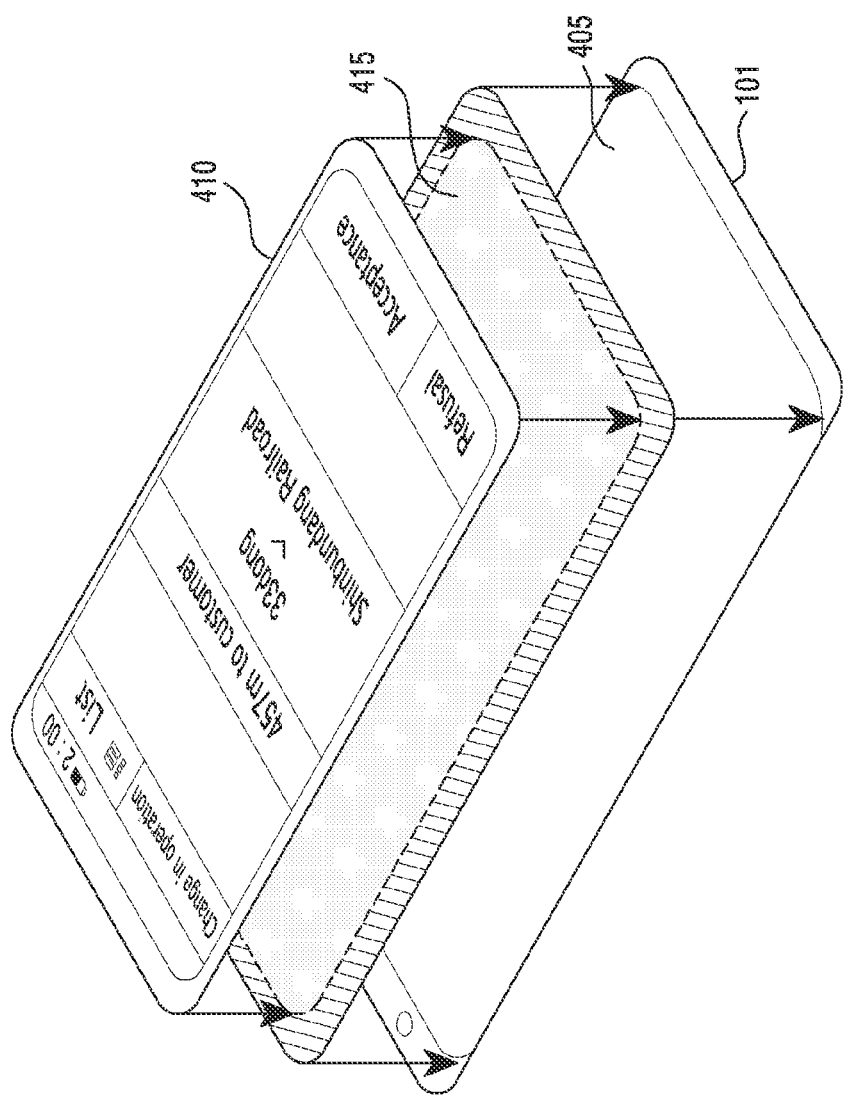
FIG. 4A is a diagram illustrating an example of a method of reducing the size of at least one layer in an electronic device according to various embodiments.

FIG. 4A is a diagram illustrating an example of a method of reducing the size of at least one layer by an electronic device according to various embodiments.

Figure 4B:
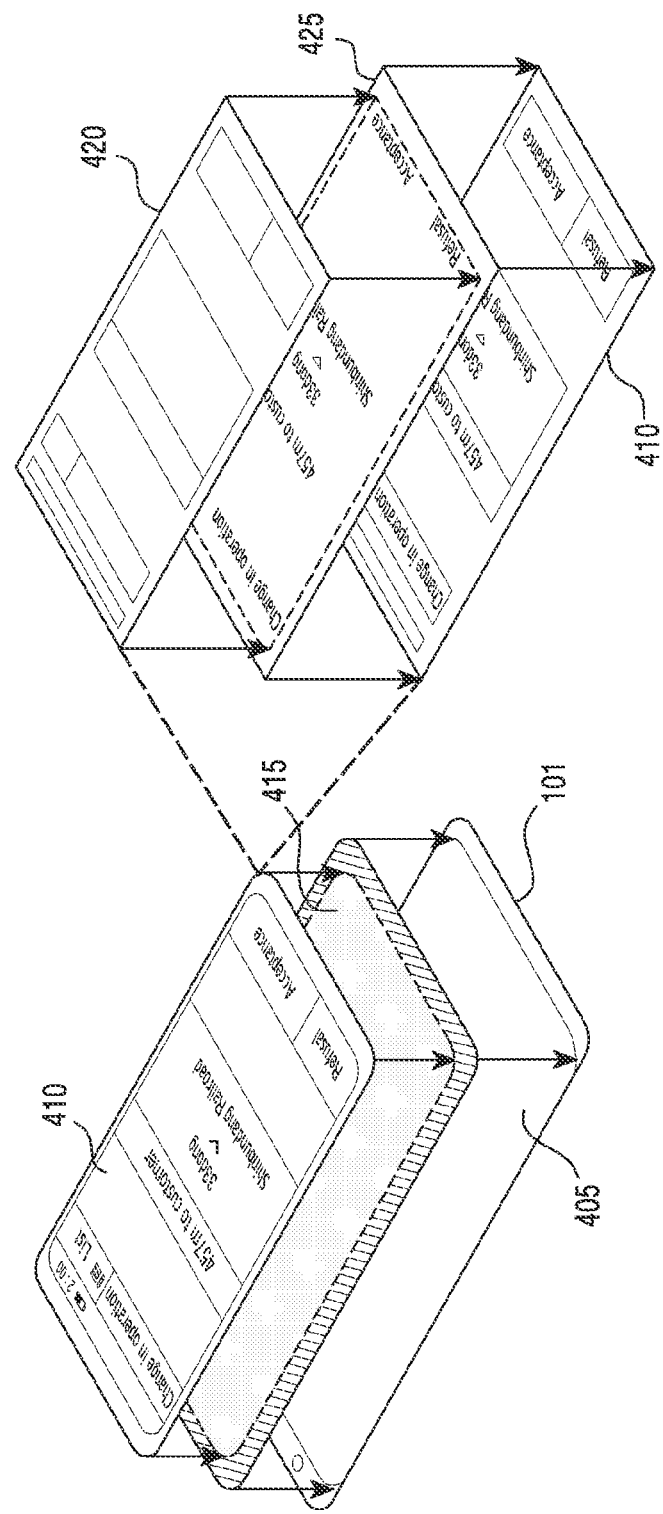
FIG. 4B is a diagram illustrating another example of a method of reducing the size of at least one layer by an electronic device according to various embodiments.

FIG. 4B is a diagram illustrating another example of a method of reducing the size of at least one layer by an electronic device according to various embodiments.

Figure 4C:
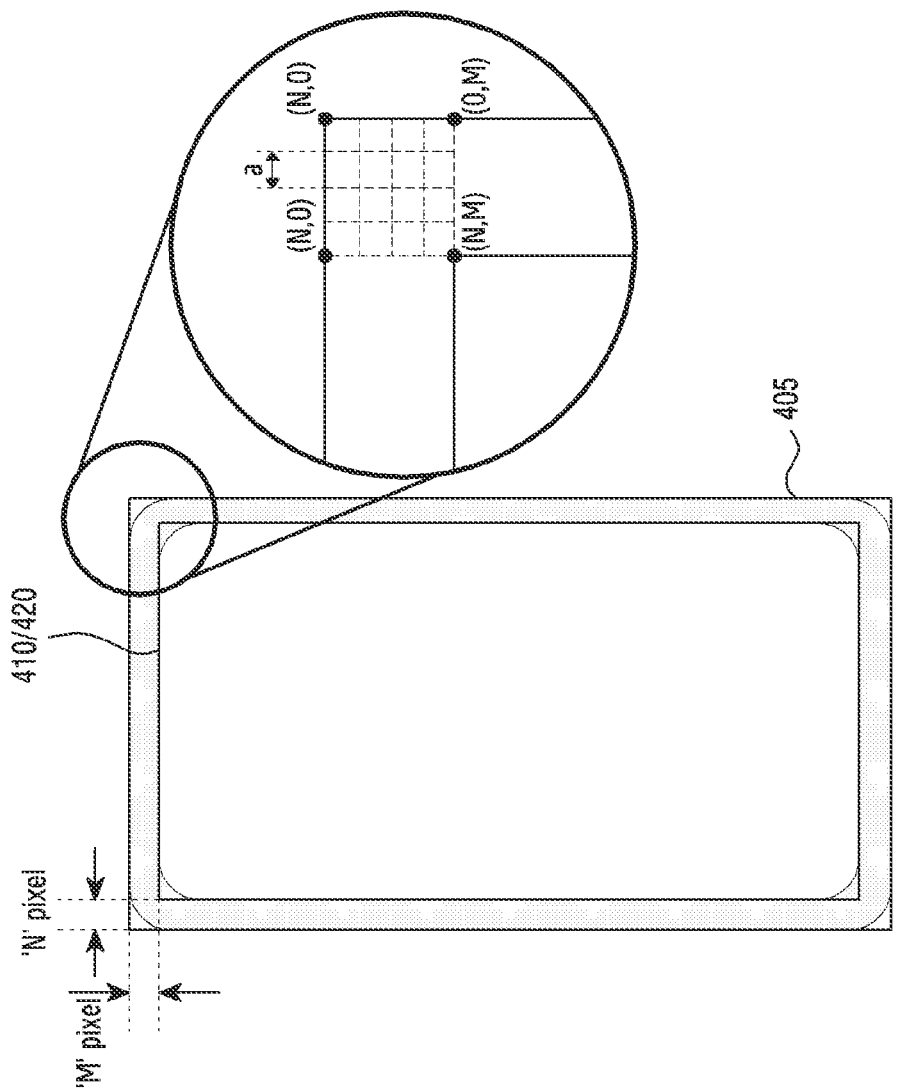
FIG. 4C is a diagram illustrating an example of a range of movement of at least one layer having a reduced size by an electronic device according to various embodiments.

FIG. 4C is a diagram illustrating an example of a range of movement of at least one layer having a reduced size by an electronic device according to various embodiments.

Figure 4D:
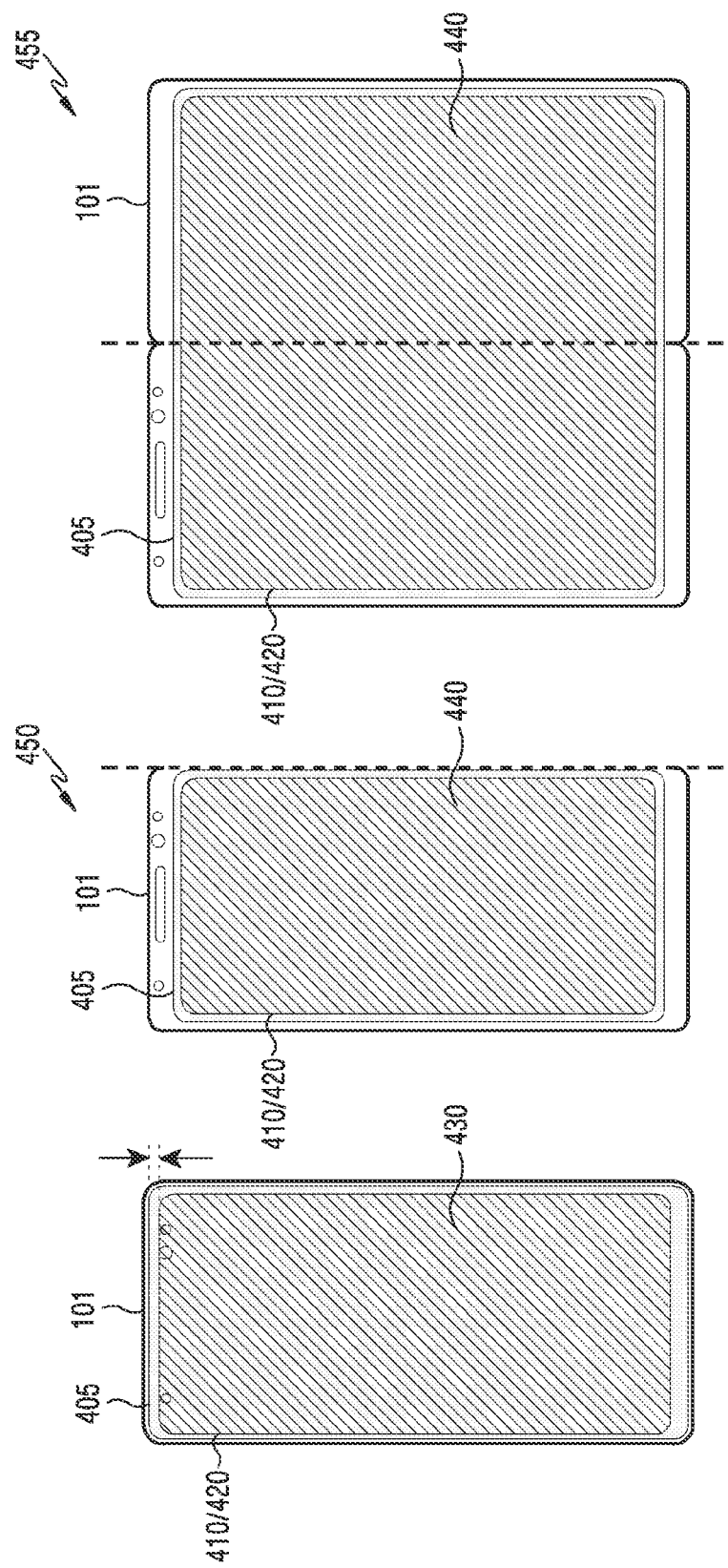
FIG. 4D is a diagram illustrating an example of a method of reducing the size of at least one layer depending on the type of display by an electronic device according to various embodiments.

FIG. 4D is a diagram illustrating an example of a method of reducing the size of at least one layer depending on the type of display by an electronic device according to various embodiments.

Figure 4E:
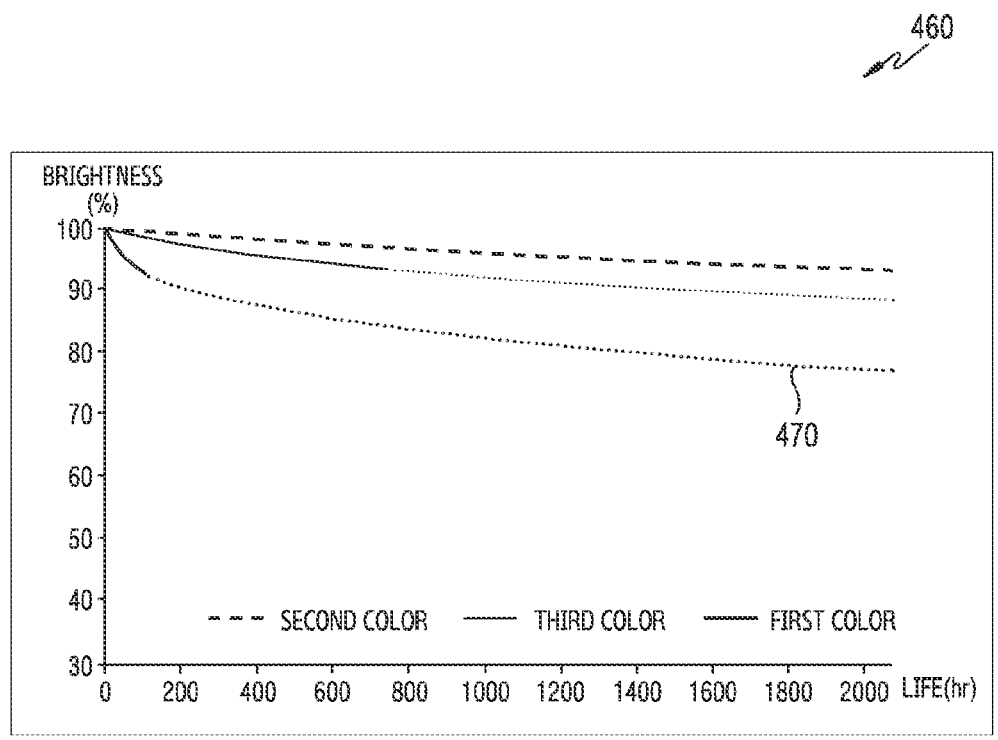
FIG. 4E is a graph illustrating the degree of degradation of subpixels included in a display panel of an electronic device according to various embodiments.

FIG. 4E is a graph illustrating the degree of degradation of subpixels included in a display panel of an electronic device according to various embodiments.

Figure 5:
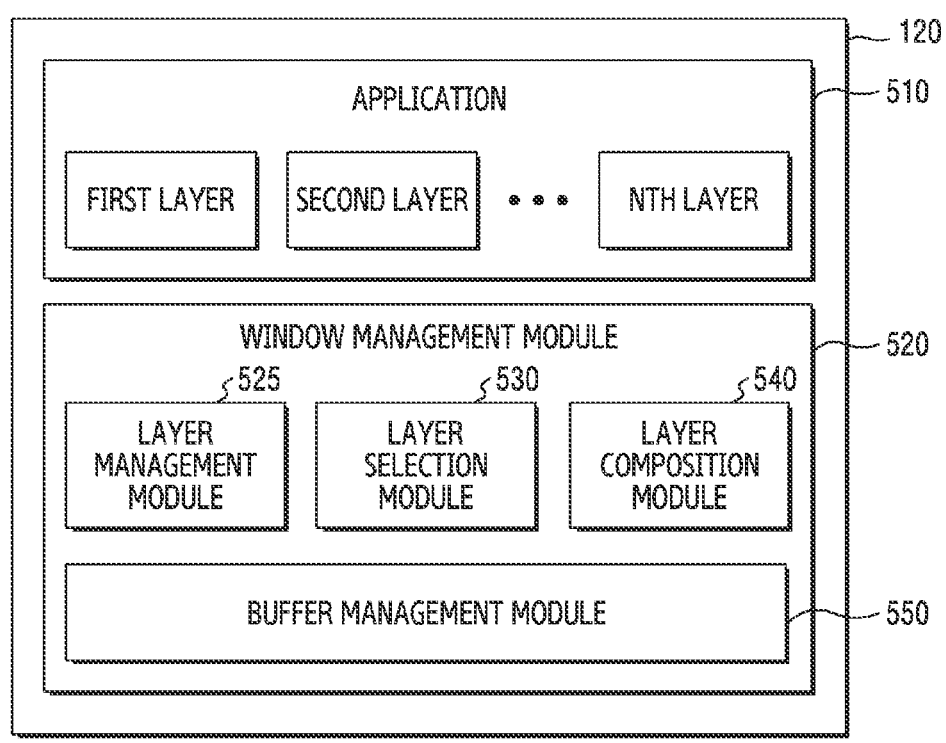
FIG. 5 is a diagram illustrating an example of program modules used by a processor of an electronic device according to various embodiments.

FIG. 5 is a diagram illustrating an example of program modules used by a processor of an electronic device according to various embodiments.

Referring to FIG. 3, the electronic device 101 may include at least one processor 120, at least one memory 130, and a display device 160.

The at least one processor 120 may include the processor 120 of FIG. 1, the at least one memory 130 may include the memory 130 of FIG. 1, and the display device 160 may include the display device 160 of FIG. 1 and/or FIG. 2.

According to various embodiments, the at least one processor 120 may receive an input for executing one of a plurality of applications stored in the electronic device 101. According to various embodiments, the input may be received via a touch circuit 250 included in the display device 160. For example, the input may include a touch input on one icon among a plurality of icons that represent the plurality of applications, respectively. According to various embodiments, the input may include a command to execute a first application that differs from a second application, while the second application is executed among the plurality of applications. For example, the input may include an input for selecting an icon representing a camera function of a user interface of a messenger application while the messenger application is executed. However, the disclosure is not limited thereto.

According to various embodiments, in response to reception of the input for executing the application, the at least one processor 120 may identify whether it is required to control display of at least a part of a plurality of layers of a user interface of the application. According to various embodiments, the plurality of layers may overlap each other and may be displayed via the display device 160. According to various embodiments, each of the plurality of layers may be referred to as an application display layer.

For example, the at least one processor 120 may identify whether it is required to control display of at least a part of the plurality of layers, in order to prevent the burn-in phenomenon from occurring in the display device 160. For example, the at least one processor 120 may identify whether the application corresponds to an application that is installed in the electronic device 101 based on a user input, and may identify that it is required to control display of at least a part of the plurality of layers of the user interface of the application in order to prevent the burn-in phenomenon. As another example, if the plurality of layers of the user interface of the application includes at least one layer that maintains display until a user input is received, the at least one processor 120 may control display of at least a part of the plurality of layers of the user interface of the application in order to prevent the burn-in phenomenon. As another example, if the plurality of layers of the user interface of the application includes at least one layer that maintains display during a predetermined time interval, the at least one processor 120 may control display of at least a part of the plurality of layers of the user interface of the application in order to prevent the burn-in phenomenon. As another example, if the plurality of layers of the user interface of the application includes at least one layer that includes at least one object capable of receiving a touch input, the at least one processor 120 may control display of at least a part of the plurality of layers of the user interface of the application in order to prevent the burn-in phenomenon. However, the disclosure is not limited thereto.

According to various embodiments, the at least one processor 120 may determine whether the state of the electronic device 101 corresponds to a predetermined condition in response to the reception of the input, and may identify whether it is required to control display of at least a part of the plurality of layers of the user interface of the application based on the identification that the state of the electronic device 101 corresponds to the predetermined condition. According to various embodiments, the fact that the state of the electronic device 101 corresponds to the predetermined condition may indicate that a screen brightness represented by the electronic device 101 is higher than a reference brightness. According to various embodiments, the fact that the state of the electronic device 101 corresponds to the predetermined condition may indicate that the illuminance value of an environment where the electronic device 101 is present, which is obtained using an illuminance sensor of the electronic device 101, falls within a reference range. However, the disclosure is not limited thereto.

According to various embodiments, the at least one processor 120 may change display of at least a part of the plurality of layers in response to identifying that it is required to control display of at least a part of the plurality of layers of the user interface.

According to various embodiments, the at least one processor 120 may change display of at least a part of the plurality of layers by changing the size of at least one layer among the plurality of layers of the user interface. According to various embodiments, the at least one layer may be a layer that maintains display until a user input is received. According to various embodiments, the at least one layer may be a layer that maintains display during a predetermined time interval. According to various embodiments, the at least one layer may be a layer including at least one object capable of receiving a touch input. According to various embodiments, the at least one layer may be a layer configured to display fixed content. However, the disclosure is not limited thereto.

For example, the at least one processor 120 may reduce the size of the at least one layer among the plurality of layers. The at least one processor 120 may reduce the size of the at least one layer, so as to move the at least one layer at predetermined intervals in order to prevent the burn-in phenomenon.

According to various embodiments, the at least one processor 120 may combine the plurality of layers including the at least one layer in order to display the user interface of the application, and may reduce the sizes of the combined layers so as to reduce the size of the at least one layer. For example, referring to FIG. 4A, the size of the user interface of the application may be configured to correspond to the size of an active area 405 of the display device 160 of the electronic device 101. According to various embodiments, the active area 405 may be an area usable for displaying content or information in the display device 160. According to various embodiments, the active area 405 may be referred to as a display area of the display device 160. The at least one processor 120 may reduce the sizes of the combined layers by adjusting the sizes of the combined layers to a second predetermined size smaller than the size (e.g., a first predetermined size) of the active area 405. For example, the at least one processor 120 may obtain or produce the user interface 410 including the combined layers having the second predetermined size (i.e., a reduced size).

According to various embodiments, the at least one processor 120 may fill a blank space corresponding to the difference between the size of the active area 405 and the size of the user interface 410 with a predetermined layer. For example, the at least one processor 120 may obtain or produce a layer 415 to fill the blank space. According to various embodiments, the layer 415 may be configured as a part of the user interface 410, or may be configured as another user interface (e.g., a user interface of a system application) that differs from the user interface 410. According to various embodiments, the layer 415 may be configured with a color corresponding to the color of the user interface 410. For example, the layer 415 may be configured with a color corresponding to the representative color of the user interface 410. As another example, the layer 415 may be configured with a gradation of color from the color of the edge area of the user interface 410 to a predetermined color. As another example, the layer 415 may be configured as a black screen or a white screen. As another example, the layer 415 may be configured by applying a blur processing to the user interface 410 having a default size. However, the disclosure is not limited thereto.

According to other embodiments, the at least one processor 120 may use, as the layer 415, a window of another application (or another user interface that differs from the user interface 410), which is executed as background and differs from an application for displaying the user interface 410.

According to various embodiments, the at least one processor 120 may reduce the size of the at least one layer, and may combine the at least one reduced layer and the remaining layers among the plurality of layers. In this instance, the remaining layers may be maintained in the size of the active area of the display device 160 of the electronic device 101, unlike the at least one reduced layer in the reduced size. For example, referring to FIG. 4B, the at least one processor 120 may reduce (or decrease) the size of at least one layer 420 among the plurality of layers of the user interface 410. The at least one processor 120 may combine the at least one layer 420 in the reduced size (e.g., the second predetermined size) and the remaining layers 425. The sizes of the remaining layers 425 may correspond to the size of the active area 405, unlike the size of at least one reduced layer 420. In other words, the remaining layers 425 may be maintained in the first predetermined size, unlike the at least one layer 420 in the reduced size. The at least one processor 120 may represent the user interface 410 obtained by combining the remaining layers 425 and the at least one layer 420 via the display device 160. According to various embodiments, the at least one processor 120 may fill a blank space corresponding to the difference between the size of the active area 405 and the size of the at least one layer 420 with a predetermined layer. For example, the at least one processor 120 may obtain or produce the layer 415 to fill the blank space. According to various embodiments, the layer 415 may be disposed directly above and/or below the at least one layer 420. However, the disclosure is not limited thereto.

According to embodiments, the operation of producing the at least one layer 415 may be bypassed or skipped.

According to various embodiments, the at least one processor 120 may move the at least one layer having the reduced size at predetermined intervals. According to various embodiments, the predetermined interval may be determined based on the life of an organic light emitting diode (OLED). For example, the at least one processor 120 may move the at least one layer in response to identifying that a predetermined period of time elapses from the timing at which the at least one layer having the reduced size is represented in a first area of the display device 160, and may represent the at least one layer having the reduced size in a second area that partially overlaps with the first area. For example, the at least one processor 120 may display the at least one layer having the reduced size in the second area by moving the at least one layer by a predetermined number of pixels from the first area. According to various embodiments, the predetermined number of pixels may be determined based on the life of an OLED.

According to various embodiments, the at least one processor 120 may move the at least one layer having the reduced size at predetermined intervals within a predetermined range. The at least one processor 120 may change the display location of the at least one layer having the reduced size at predetermined intervals within a predetermined range that is determined by a visibility experiment. For example, referring to FIG. 4C, the at least one processor 120 may move the user interface 410 having the reduced size or the at least one layer 420 having the reduced size by a predetermined number of pixels, "a" pixels, at predetermined intervals. The user interface 410 or the at least one layer 420 that is moved by a predetermined number of pixels, "a" pixels, at predetermined intervals may be moved within a predetermined range of "N×M" pixels ("N" pixels in the horizontal axis and "M" pixels in the vertical axis). According to various embodiments, the movement path of the user interface 410 or the at least one layer 420 that is moved at predetermined intervals may be predetermined or previously designated by the at least one processor 120. According to various embodiments, the movement path of the user interface 410 or the at least one layer 420 that is moved at predetermined intervals may be randomly determined within the predetermined range of "N×M" pixels.

According to various embodiments, the user interface 410 or the at least one layer 420 may be moved when an application executed is changed, when the state of a display panel is changed, or when the state of a user who uses the electronic device 101 is changed. According to various embodiments, the change of the state of the display panel may include the change of the state of the display panel to an active state (or a state of being supplied with normal power). According to various embodiments, the change of the state of the display panel may include the change of the state of the display panel to an inactive state (or a state of being disconnected from power). According to various embodiments, the change of the state of the display panel may include the change of the state of the electronic device 101 to a low power state (e.g., always on display (AOD)). In at least a part of the time interval in which the electronic device 101 is in the AOD state, at least a part of the at least one processor 120 may be in the inactive state, and the display panel may operate in the active state.

According to various embodiments, differently for each type of the display device 160, the at least one processor 120 may identify the shape of the at least one layer (or user interface) having the reduced size, and may identify the movement range of the at least one layer (or user interface).

For example, referring to FIG. 4D, if the type of the display device 160 is a hole display 430 in which at least one element (e.g., an illuminance sensor or the like) of the electronic device 101 is disposed in a display area (or active area) of the display device, the at least one processor 120 may reduce the size of the user interface 410 or the at least one layer 420 in a manner that includes the area, in which the at least one elements is disposed, in the user interface 410 or the at least one layer 420. The at least one processor 120 may change the display location of the user interface 410 or the at least one layer 420 having the reduced size as long as the user interface 410 or the at least one layer 420 having the reduced size includes the at least one element, at predetermined intervals.

As another example, referring to FIG. 4D, if the type of the display device 160 is a foldable display 440, the processor 120 may reduce the size of the user interface 410 or the at least one layer 420 based on the state of a foldable area of the display device 160. For example, the state of the display 440 is in the unfolded state (folded-out state) 450, the at least one processor 120 may reduce the size of the user interface 410 or the at least one layer 420 in a manner that excludes the foldable area of the display device 160 from the user interface 410 or the at least one layer 420. The at least one processor 120 may change the display location of the user interface 410 or the at least one layer 420 having the reduced size as long as the foldable area of the display device 160 is not included in the user interface 410 or the at least one layer 420 having the reduced size, at predetermined intervals. As another example, the state of the display 440 is in the folded state (folded-in state) 455, the at least one processor 120 may reduce the size of the user interface 410 or the at least one layer 420 in a manner that includes the foldable area of the display device 160 in the user interface 410 or the at least one layer 420. The at least one processor 120 may change the display location of the user interface 410 or the at least one layer 420 having the reduced size in the state in which the user interface 410 or the at least one layer 420 having the reduced size includes the foldable area of the display device 160, at predetermined intervals.

According to various embodiments, the at least one processor 120 may change display of at least a part of the plurality of layers by adjusting a display property corresponding to a predetermined color included in at least a part of a first layer configured to display fixed content (e.g., content that does not move more than a predetermined period of time) among a plurality of layers of the user interface. According to various embodiments, the display property may include at least one of the brightness or chroma of the predetermined color.

According to various embodiments, the at least one processor 120 may change display of at least a part of the plurality of layers by adjusting the intensity of light emitted by at least a part of luminous elements used for displaying the user interface. For example, the at least one processor 120 may change display of at least a part of the plurality of layers by adjusting the intensity of light emitted by at least a part of elements (e.g., B sub-pixels) for a first color among luminous elements (e.g., R (red) sub-pixels, G (green) sub-pixels, B (blue) sub-pixels, W (white) sub-pixels, and the like) used for displaying the user interface. For example, referring to FIG. 4E, as shown in a graph 460, the sub-pixels (e.g., B sub-pixels) 470 for the first color among the pixels of the display device 160 may be more easily burned-in by emission of light than (relative to) the other sub-pixels. According to various embodiments, the at least one processor 120 may reduce the intensity of light emitted from the sub-pixels for the first color, and may prevent a burn-in phenomenon. For example, the at least one processor 120 may adjust the intensity of light emitted by at least a part of the luminous elements by reducing, by a predetermined ratio, the intensity of light emitted by each of the plurality of sub-pixels for the first color. According to some embodiments, the plurality of sub-pixels for the first color may emit light with an intensity equally reduced based on the above-described adjustment. According to some other embodiments, the plurality of sub-pixels for the first color may emit light with different intensities based on the adjustment in a manner that reduces the average intensity of the light emitted by the plurality of sub-pixels for the first color. As another example, the at least one processor 120 may adjust the intensity of light emitted by at least a part of the luminous elements by inactivating at least one sub-pixel among the plurality of sub-pixels for the first color and activating the remaining sub-pixels for the first color. The luminous elements may include pixels of a first group and pixels of a second group which are disposed alternately (repeatedly) with each other. The at least one processor 120 may adjust the intensity of light emitted by at least a part of the luminous elements by inactivating either a plurality of sub-pixels for the first color included in the pixels of the first group or a plurality of sub-pixels for the first color included in the pixels of the second group. According to some embodiments, the intensity of light may be adjusted by alternately inactivating the plurality of sub-pixels for the first color included in the pixels of the first group and the plurality of sub-pixels for the first color included in the pixels of the second group.

According to various embodiments, the at least one processor 120 may change display of at least a part of the plurality of layers using program modules stored in the memory 130.

For example, referring to FIG. 5, the at least one processor 120 may detect an input for executing an application 510 using the application 510. In response to the detection of the input, the at least one processor 120 may call a plurality of layers (e.g., application display layers) included in the application 510 using the application 510. In response to the call, the at least one processor 120 may identify whether to change display of at least a part of the plurality of layers. For example, in response to the call, the at least one processor 120 may identify whether to reduce the size of at least one layer among the plurality of layers. The at least one processor 120 may produce at least one layer having a reduced size using a layer management module 525 included in a window management module 520, in response to identifying that reduction of the size of at least one layer of the plurality of layers is needed. The at least one processor 120 may allocate a graphic buffer using a buffer management module 550 included in the window management module 520, in response to the production of the at least one layer. The at least one processor 120 may select the plurality of layers including the at least one layer having the reduced size using a layer selection module 530 included in the window management module 520, in response to the production of the at least one layer. In response to the selection, the at least one processor 120 may move or combine drawing coordinates of the plurality of selected layers using a layer combination module 540 included in the window management module 520. The at least one processor 120 may perform operations for drawing the layers of which coordinates are moved or combined on the display device 160 using the buffer management module 550 included in the window management module 520. The application 510 may request the buffer management module 550 to provide an output to the display device 160, in response to performing the operations. The at least one processor 120 may provide graphic buffer information to the display device 160 (e.g., a display driver IC 230 in the display device 160)) using the buffer management module 550, in response to the request.

As described above, to prevent the burn-in phenomenon, the electronic device 101 according to various embodiments may reduce the size of a user interface or at least one layer, or may reduce the intensity of light emitted from at least a part of luminance elements used for providing the user interface or the at least one layer.

As described above, an electronic device (e.g., the electronic device 101) may include: a display panel (e.g., the display device 160) having an active area in a first predetermined size; and a processor (e.g., the processor 120). The processor is configured to: execute a predetermined application including a first application display layer configured to display fixed content and a second application display layer configured to display variable content; display, based at least on the fixed content, the first application display layer in a second predetermined size smaller than the first predetermined size, while the predetermined application is executed; and at least temporarily move the first application display layer displayed in the second predetermined size within the active area.

According to various embodiments, the processor may be further configured to display the second application display layer in the second predetermined size smaller than the first predetermined size, while the predetermined application is executed.

According to various embodiments, the processor may be further configured to move the first application display layer within the active area at predetermined intervals, in response to identifying that a predetermined (specified) period of time elapses from the timing at which the first application display layer is displayed in the second predetermined size.

According to various embodiments, the processor may be configured to identify that the brightness of the display panel is higher than a predetermined value, in response to executing the predetermined application, and to display the first application display layer in the second predetermined size, in response to identifying that the brightness of the display panel is higher than the predetermined value. According to various embodiments, the processor may be further configured to identify that the brightness of the display panel is lower than or equal to the predetermined value, in response to executing the predetermined application; and to display the first application display layer in the first predetermined size, in response to identifying that the brightness of the display panel is lower than or equal to the predetermined value.

According to various embodiments, the electronic device may further include an illuminance sensor, and the processor may be configured to obtain the illuminance value of an environment where the electronic device is located, using the illuminance sensor, and to display the first application display layer in the second designated size, in response to identifying that the obtained illuminance value falls within a reference range.

According to various embodiments, the predetermined application may be an application installed based on a user input, and the processor may be configured to display the first application display layer in the second predetermined size, in response to executing the predetermined application among a plurality of applications stored in the electronic device.

According to various embodiments, the first application display layer may be configured with the fixed content that maintains display until a user input is received.

According to various embodiments, the first application display layer may be configured to maintain display during a predetermined time interval.

According to various embodiments, the electronic device may further include a touch panel disposed on the display panel, and the first application display layer may include at least one object capable of receiving a touch input via the touch panel.

According to various embodiments, the first application display layer may at least partially overlap with the second application display layer, when viewed from the top.

According to various embodiments, in response to the execution, the processor may be further configured to adjust the intensity of blue light emitted from the display panel from a first intensity to a second intensity lower than the first intensity, and to control the display panel to emit the blue light having the second intensity while the first application layer is provided in the second predetermined size. According to various embodiments, the display panel may include pixels of a first group and pixels of a second group which are disposed alternately with each other. In response to the execution, the processor may be configured to adjust the intensity of the blue light from the first intensity to the second intensity by inactivating either a plurality of B-sub-pixels included in the pixels of the first group or a plurality of B-sub-pixels included in the pixels of the second group.

According to various embodiments, in response to identifying an input for executing the predetermined application, the processor may be further configured to produce a first composite layer which is to be interposed between the first application display layer and the second application display layer, and the first composite layer may be used to decrease the difference in color between the first application display layer and the second application display layer.

According to various embodiments, the processor may be further configured to identify the average degradation degree of each of the B-sub-pixels included in the display panel every time that the predetermined application is executed. The processor may be configured to identify the first application display layer represented using at least one B-sub-pixel having an average degradation degree higher than a reference value among the B-sub-pixels, and to display the first application display layer in the predetermined second size based on the identification.

According to various embodiments, the range of the movement of the first application display layer may be within a predetermined distance from the initial location of the first application display layer.

An electronic device according to various embodiments, as described above, may include a display panel and a processor. The processor may be configured to: execute a predetermined application including a first application display layer configured to display fixed content, and a second application display layer configured to display variable content; adjust a display property corresponding to a predetermined color included in at least a part of the first application display layer, based at least on the fixed content, while the predetermined application is executed; and display the fixed content included in the first application display layer of which the display property is adjusted and the variable content included in the second application display layer, via the display panel.

According to various embodiments, the predetermined color may correspond to blue.

According to various embodiments, the display property may be the brightness or chroma of the predetermined color.

An electronic device according to various embodiments, as described above, may include a memory storing instructions, a display panel, and at least one processor operatively coupled to the display panel and the memory. When the instructions are executed, the at least one processor is configured to: receive an input for executing a first application among a plurality of applications stored in the electronic device; reduce the size of at least one layer among a plurality of layers that are configured in a user interface of the first application, based at least on the reception; provide the at least one layer having the reduced size in a first area in a display area of the display; and move the at least one layer among the plurality of layers in response to identifying that a predetermined (specified) period of time elapses from the timing at which the at least one layer is represented in the first area, so as to represent the at least one layer having the reduced size in a second area of the display area which partially overlap with the first area.

According to various embodiments, when the instructions are executed, the at least one processor may be configured to: identify that the brightness of the display panel is higher than a predetermined value (specified value), and reduce the size of the at least one layer among the plurality of layers in response to identifying that the brightness of the display panel is higher than the predetermined value. According to various embodiments, when the instructions are executed, the at least one processor may be further configured to: identify that the brightness of the display panel is lower than or equal to the predetermined value in response to the reception; and represent the at least one layer having a default size in the user interface in response to identifying that the brightness of the display panel is lower than or equal to the predetermined value.

According to various embodiments, the electronic device may further include an illuminance sensor, and when the instructions are executed, the at least one processor may be configured to: obtain an illuminance value associated with an environment where the electronic device is located using the illuminance sensor; and reduce the size of the at least one layer among the plurality of layers in response to identifying that the obtained illuminance value falls within a reference range.

According to various embodiments, when the instructions are executed, the at least one processor may be configured to: identify that the first application corresponds to an application installed based on a user input in response to the reception; and reduce the size of the at least one layer among the plurality of layers configured in the user interface of the first application based on identifying that the first application corresponds to the application installed based on the user input.

According to various embodiments, when the instructions are executed, the at least one processor may be configured to: identify the at least one layer that maintains display until a user input is received, from among the plurality of layers configured in the user interface of the first application, in response to the reception; and reduce the size of the at least one identified layer.

According to various embodiments, when the instructions are executed, the at least one processor may be configured to: identify the at least one layer that maintains display during a predetermined time interval, from among the plurality of layers configured in the user interface of the first application, in response to the reception; and reduce the size of the at least one identified layer.

According to various embodiments, the electronic device may further include a touch panel disposed on the display panel, and when the instructions are executed, the at least one processor may be configured to: identify the at least one layer including at least one object capable of receiving a touch input via the touch panel from among the plurality of layers configured in the user interface of the first application, in response to the reception; and reduce the size of the at least one identified layer.

According to various embodiments, when the instructions are executed, the at least one processor may be configured to: combine the at least one layer having the reduced size and the remaining layers among the plurality of layers, so as to obtain the user interface; and represent the at least one layer having the reduced size in the first area based on obtaining of the user interface.

According to various embodiments, an area that represents the remaining layers among the plurality of layers may be maintained independently from the movement of the at least one layer. For example, when viewed from the top, the at least one layer may partially overlap with the remaining layers.

According to various embodiments, when the instructions are executed, the at least one processor may be configured to: adjust the intensity of blue light emitted from the display panel from a first intensity to a second intensity lower than the first intensity based at least on the reception; control the display panel to emit the blue light having the second intensity while the at least one layer having the reduced size is represented in the first area; and control the display panel to emit blue light having the second intensity while the at least one layer having the reduced size is provided in the second area. According to various embodiments, the display panel may include pixels of a first group and pixels of a second group which are disposed alternately (repeatedly) with each other. When the instructions are executed, the at least one processor may be configured to adjust the intensity of the blue light from the first intensity to the second intensity lower than the first intensity, by inactivating either a plurality of B-sub-pixels included in the pixels of the first group and a plurality of B-sub-pixels included in the pixels of the second group.

According to various embodiments, when the instructions are executed, the at least one processor may be configured to produce a first composite layer which is to be interposed between the at least one layer and a first layer that is directly above the at least one layer among the remaining layers, based at least on the reception, and the first composite layer may be used to decrease the difference in color between the at least one layer and the first layer.

According to various embodiments, when the instructions are executed, the at least one processor may be further configured to: identify the average degradation degree (average of degree of degradation) of each of the B-sib-pixels included in the display panel every time that the user interface of the first application is represented. When the instructions are executed, the at least one processor may be configured to: identify the at least one layer, represented using at least one B-sub-pixel having an average degradation degree higher than a reference value among the B-sub-pixels, from among the plurality of layers, and reduce the size of the at least one identified layer.

According to various embodiments, when the instructions are executed, the at least one processor may be further configured to identify the instantaneous degradation degree of each of the B-sub-pixels included in the display panel every time that each of a plurality of user interfaces of the plurality of applications is provided. When the instructions are executed, the at least one processor may be configured to reduce the size of the at least one layer based at least on the reception of the input for executing the first application having an instantaneous degradation degree higher than a reference value among the plurality of applications.

According to various embodiments, when the instructions are executed, the at least one processor may be further configured to move the at least one layer at predetermined intervals, within a predetermined distance from an edge of the at least one layer represented in the first area.

As described above, an electronic device according to various embodiments may include: a memory storing instructions; a display panel; and at least one processor operatively coupled to the display panel and the memory. When the instructions are executed, the at least one processor may be configured to: identify a screen brightness in response to reception of an input for executing an application; display a user interface of the application in a first size in response to identifying that the screen brightness is lower than or equal to a reference brightness; and display the user interface of the application in a second size smaller than the first size in response to identifying that the screen brightness is higher than the reference brightness, and wherein the user interface displayed in the second size is moved at predetermined intervals.

According to various embodiments, when the instructions are executed, the at least one processor may be configured to: identify that the screen brightness is changed while the user interface is displayed in the second size; and display the user interface in the first size which is changed from the second size in response to identifying that the screen brightness is changed while the user interface is displayed in the second size. According to various embodiments, the electronic device may further include an illuminance sensor, and when the instructions are executed, the at least one processor may be configured to identify that the screen brightness is changed by identifying that a value obtained from the illuminance sensor is changed while the user interface is displayed in the second size.

An electronic device according to various embodiments, as described above, may include a display panel including an active area in a first predetermined size and a processor configured to display content via a first display layer and a second display layer. The processor may be configured to: execute a predetermined application via the second display layer set to a second predetermined size smaller than the first predetermined size; display the first display layer having the first predetermined size in a predetermined color below the second display layer based on the execution; and at least temporarily move the second display layer set to the second predetermined size within the first display layer.

Figure 6:
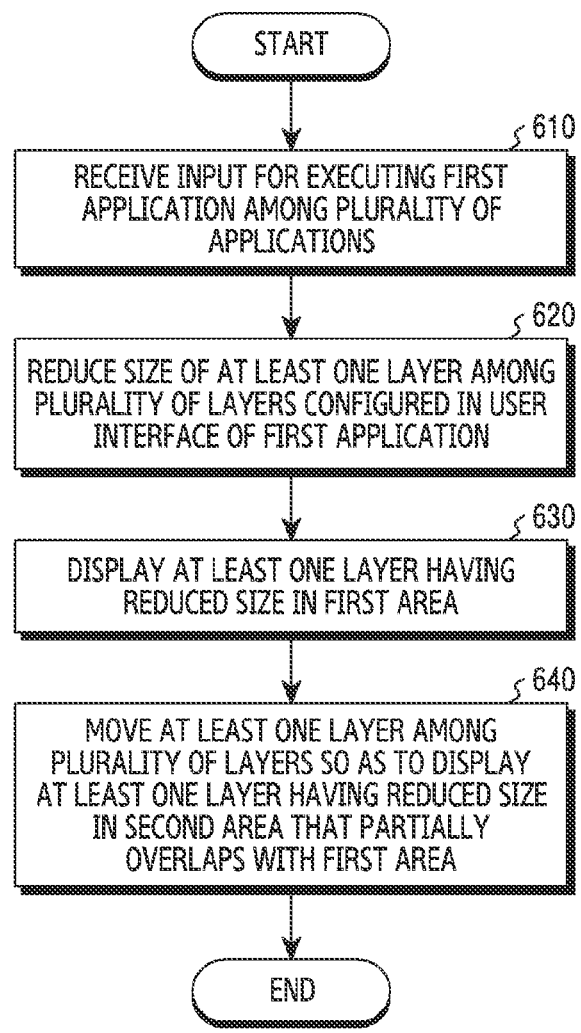
FIG. 6 is a diagram illustrating an example of operation of an electronic device according to various embodiments.

FIG. 6 is a diagram illustrating an example of operation of an electronic device according to various embodiments. The operation may be performed by the electronic device 101 of FIG. 1, the electronic device 101 of FIG. 3, or the at least one processor 120 of the electronic device 101.

Referring to FIG. 6, in operation 610, the at least one processor 120 may receive an input for executing a first application among a plurality of applications. According to various embodiments, the first application may be an application installed based on a user input. According to various embodiments, the first application may be an application classified from the plurality of applications at the stage of installing the first application. According to various embodiments, the first application may be a predetermined application including a first application display layer configured to display fixed content and a second application display layer configured to display variable content. According to various embodiments, the first application display layer may be configured with the fixed content that maintains display until a user input is received. According to various embodiments, the first application display layer may be a layer configured to maintain display during a predetermined time interval. According to various embodiments, the first application display layer may be a layer including at least one object capable of receiving a touch input. According to various embodiments, the first application display layer may at least partially overlap with the second application display layer, when viewed from the top.

In operation 620, the at least one processor 120 may reduce the size of at least one layer among a plurality of layers of a user interface of the first application. For example, the at least one processor 120 may reduce the size of the at least one layer including the first application display layer among the plurality of layers, in order to prevent the burn-in phenomenon.

In operation 630, the at least one processor 120 may display (or represent) the at least one layer having the reduced size in a first area of a display area of the display device 160. According to various embodiments, the at least one processor 120 may represent the user interface of the application by representing the at least one layer having the reduced size together with the layers (e.g., the second application display layer) remaining after excluding the at least one layer from the plurality of layers.

In operation 640, the at least one processor 120 may display (or represent) the at least one layer having the reduced size in a second area that partially overlaps with the first area, by moving the at least one layer among the plurality of layers. For example, the at least one processor 120 may represent the at least one layer having the reduced size in the second area by moving the at least one layer among the plurality of layers, in response to identifying that a predetermined period of time elapses from the timing at which the at least one layer is represented in the first area. According to various embodiments, the processor 120 may change the coordinates of a touch input for the at least one layer by interoperating with movement of the coordinates of the at least one layer.

As described above, the electronic device 101 according to various embodiments may reduce the size of at least one layer among a plurality of layers of a user interface of an application, in response to reception of an input for executing the application, may represent the layer having the reduced size on the display device 160, and may move the layer with the reduced size which is represented on the display device 160 at predetermined intervals, so as to prevent the burn-in phenomenon.

Figure 7:
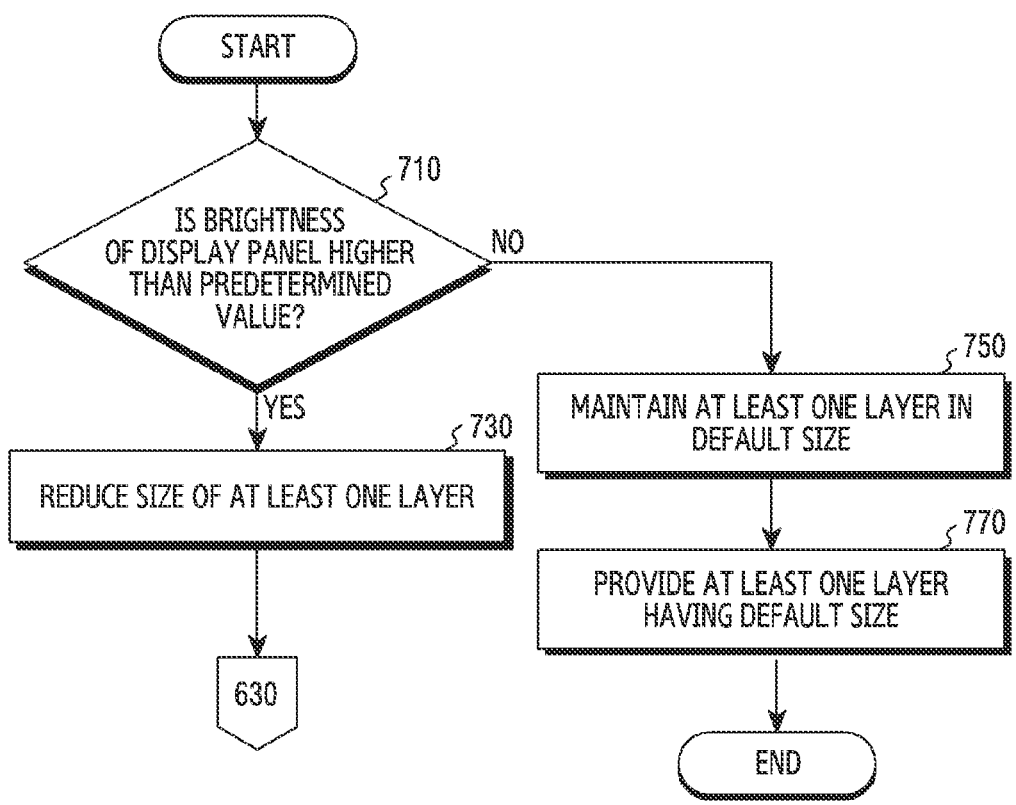
FIG. 7 is a diagram illustrating an example of an operation of reducing the size of at least one layer by an electronic device according to various embodiments.

FIG. 7 is a diagram illustrating an example of an operation of reducing the size of at least one layer by an electronic device according to various embodiments. The operation may be performed by the electronic device 101 of FIG. 1, the electronic device 101 of FIG. 3, or the at least one processor 120 of the electronic device 101.

Operations 710 and 730 of FIG. 7 may be related to operation 620 of FIG. 6.

Referring to FIG. 7, in operation 710, the at least one processor 120 may identify whether the brightness of a display panel is higher than a predetermined value. For example, the at least one processor 120 may identify whether the brightness of a screen that is being represented via the display panel is higher than the predetermined value, in response to reception of an input for executing the first application among the plurality of applications. According to various embodiments, the predetermined brightness may be configured in order to identify whether the probability that the burn-in phenomenon will occur on the display panel is high. According to various embodiments, the predetermined brightness may be configured as a predetermined value. According to various embodiments, the predetermined brightness may be changed based on the capacity of a rechargeable battery included in the electronic device 101. According to various embodiments, the predetermined brightness may be configured by a user input. The at least one processor 120 may perform operation 730 if the brightness of the screen is higher than the predetermined value. Unlike the above, the at least one processor 120 may perform operation 750 if the brightness of the screen is lower than or equal to the predetermined value.

In operation 730, the at least one processor 120 may reduce the size of the at least one layer based on identifying that the brightness of the display panel is higher than the predetermined value. For example, the at least one processor 120 may reduce the size of the at least one layer, so as to move the at least one layer in order to prevent the burn-in phenomenon. After performing operation 730, the at least one processor 120 may proceed with operation 630.

In operation 750, the at least one processor 120 may maintain the at least one layer in a default size based on identifying that the brightness of the display panel is lower than or equal to the predetermined value. According to various embodiments, the default size may correspond to the size of the display area of the display panel. According to various embodiments, the default size may be a size determined for the user interface of the application. However, the disclosure is not limited thereto.

In operation 770, the at least one processor 120 may represent the at least one layer having the default size via the display panel. After representing the at least one layer, the at least one processor 120 may terminate the present algorithm.

As described above, the electronic device 101 according to various embodiments may identify whether the brightness represented via a display panel is the brightness that may cause burn-in in the display panel, may reduce the size of at least one layer among a plurality of layer configured in a user interface of an executed application based on the identification, and may move the at least one layer having the reduced size at predetermined intervals. In other words, the electronic device 101 according to various embodiments may provide at least one layer having a size that differs depending on the brightness provided via the display panel.

Figure 8:
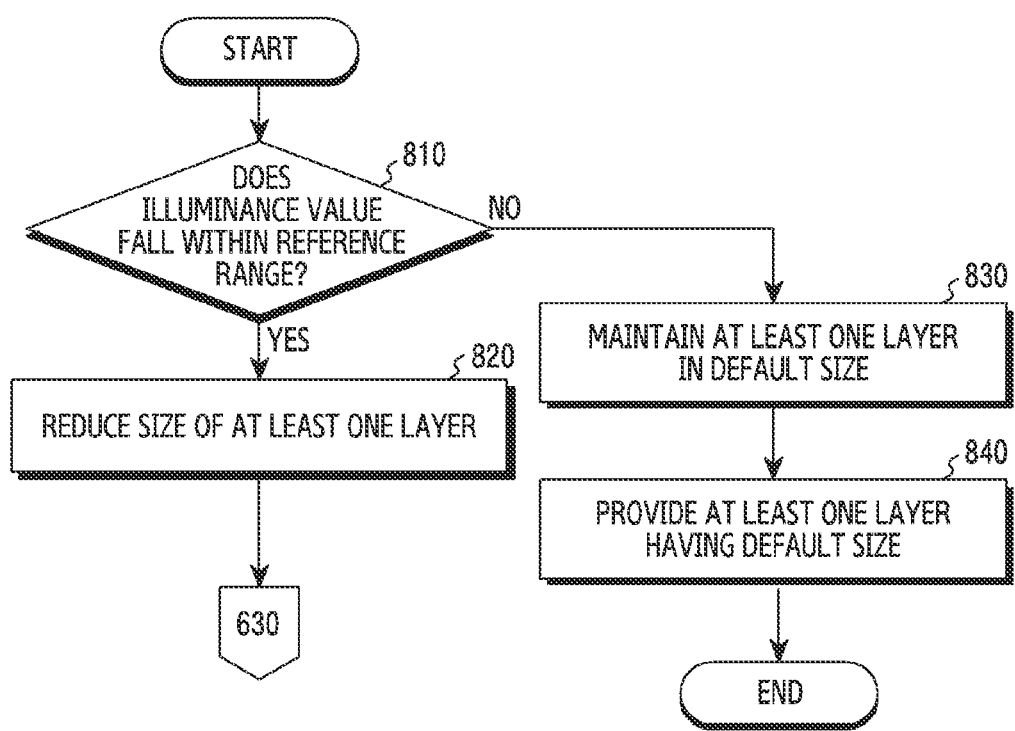
FIG. 8 is a diagram illustrating another example of an operation of reducing the size of at least one layer by an electronic device according to various embodiments.

FIG. 8 is a diagram illustrating another example of an operation of reducing the size of at least one layer by an electronic device according to various embodiments. The operation may be performed by the electronic device 101 of FIG. 1, the electronic device 101 of FIG. 3, or the at least one processor 120 of the electronic device 101.

Operations 810 and 830 of FIG. 8 may be related to operation 620 of FIG. 6.

Referring to FIG. 8, in operation 810, the at least one processor 120 may identify whether the illuminance value of an environment where the electronic device 101 is located falls within a reference range. For example, the at least one processor 120 may identify whether the illuminance value obtained using an illuminance sensor of the electronic device 101 falls within the reference range, in response to reception of an input for executing the first application among the plurality of applications. According to various embodiments, if the illuminance value falls within the reference range, the at least one processor 120 may identify that the illuminance of an ambient environment of the electronic device 101 is higher than a reference illuminance. The fact that the illuminance of the ambient environment of the electronic device 101 is higher than the reference illuminance, may indicate that a relatively high brightness needs to be provided via the display panel. According to various embodiments, if the illuminance value is beyond (outside of) the reference range, the at least one processor 120 may identify that the illuminance of the ambient environment of the electronic device 101 is lower than or equal to the reference illuminance. The fact that the illuminance of the ambient environment of the electronic device 101 is lower than or equal to the reference illuminance, may indicate that a relatively low brightness may be provided via the display panel. If the illuminance value falls within the reference range, the at least one processor 120 may proceed with operation 820. Unlike the above, if the illuminance value is beyond the reference range, the at least one processor 120 may proceed with operation 830.

In operation 820, the at least one processor 120 may reduce the size of the at least one layer based on identifying that the illuminance value falls within the reference range. After performing operation 820, the at least one processor 120 may perform operation 630.

In operation 830, the at least one processor 120 may maintain the at least one layer in a default size based on identifying that the illuminance value is beyond the reference range. According to various embodiments, the default size may correspond to the default size defined in FIG. 7.

In operation 850, the at least one processor 120 may represent the at least one layer having the default size via the display panel. After representing the at least one layer, the at least one processor 120 may terminate the present algorithm.

As described above, the electronic device 101 according to various embodiments may identify the ambient illuminance of the electronic device 101 using the illuminance sensor, so as to identify whether the current state of the electronic device 101 is in the state of causing the burn-in phenomenon.

Figure 9:
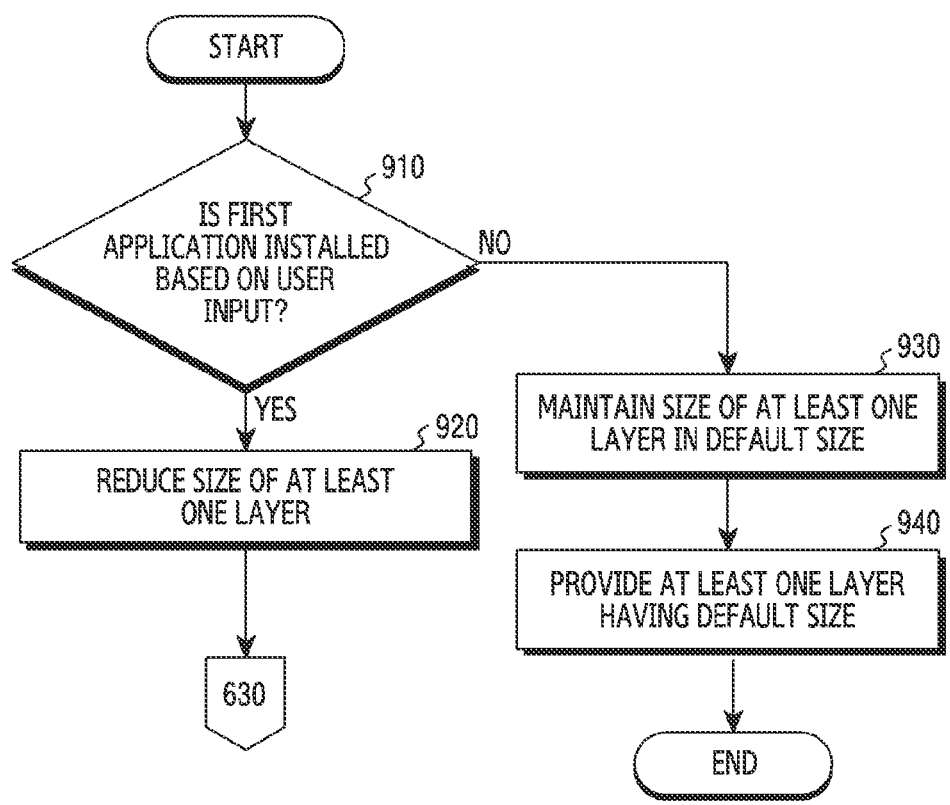
FIG. 9 is a diagram illustrating another example of an operation of reducing the size of at least one layer by an electronic device according to various embodiments.

FIG. 9 is a diagram illustrating another example of an operation of reducing the size of at least one layer by an electronic device according to various embodiments. The operation may be performed by the electronic device 101 of FIG. 1, the electronic device 101 of FIG. 3, or the at least one processor 120 of the electronic device 101.

Operations 910 and 920 of FIG. 9 may be related to operation 620 of FIG. 6.

Referring to FIG. 9, in operation 910, the at least one processor 120 may identify whether the first application is an application installed based on a user input among the plurality of applications. According to various embodiments, the application installed based on the user input may be an application installed in the electronic device 101 after the electronic device 101 is manufactured. According to various embodiments, the application installed based on the user input may be an application that does not include a configuration for preventing the burn-in phenomenon. According to various embodiments, the application installed based on the user input may be an application installed using another application (e.g., Playstore™, App Store™, and the like). According to various embodiments, the at least one processor 120 may perform operation 920 based on identifying that the first application is the application installed based on the user input. Unlike the above, if it is identified that the first application is not the application installed based on the user input, operation 930 may be performed.

In operation 920, the at least one processor 120 may reduce the size of the at least one layer based on identifying that the first application is the application installed based on the user input. After performing operation 920, the at least one processor 120 may proceed with operation 630.

In operation 930, the at least one processor 120 may maintain the at least one layer in a default size based on identifying that the first application is not the application installed based on the user input. According to various embodiments, the default size may correspond to the default size defined in FIG. 7.

In operation 940, the at least one processor 120 may represent the at least one layer having the default size via the display panel. After representing the at least one layer, the at least one processor 120 may terminate the present algorithm.

As described above, the electronic device 101 according to various embodiments may identify whether an application related to an execution request is an application that may cause the burn-in phenomenon (e.g., an application installed based on a user input), so as to identify whether the electronic device 101 is currently in the state of causing the burn-in phenomenon.

Figure 10:
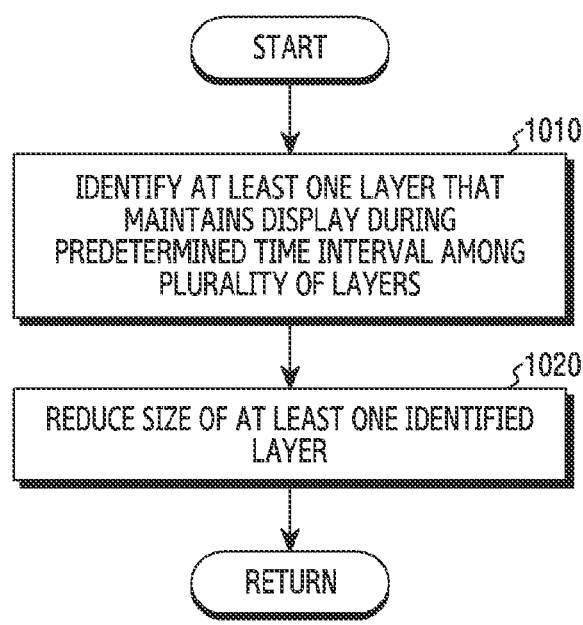
FIG. 10 is a diagram illustrating an example of an operation of identifying at least one layer of which the size is to be reduced among a plurality of layers, by an electronic device according to various embodiments.

FIG. 10 is a diagram illustrating an example of an operation of identifying at least one layer of which the size is to be reduced among a plurality of layers, by an electronic device according to various embodiments. The operation may be performed by the electronic device 101 of FIG. 1, the electronic device 101 of FIG. 3, or the at least one processor 120 of the electronic device 101.

Operations 1010 and 1020 of FIG. 10 may be related to operation 620 of FIG. 6.

Referring to FIG. 10, in operation 1010, the at least one processor 120 may identify at least one layer that maintains display during a predetermined time interval among a plurality of layers. According to various embodiments, the at least one processor 120 may identify the at least one layer that maintains display during the predetermined time interval among the plurality of layers, in response to reception of an input for executing the first application among the plurality of applications. The burn-in phenomenon may occur on the display panel if a screen (or content) is continuously displayed. The at least one processor 120 according to various embodiments may identify whether the plurality of layers of the first application includes a layer that maintains display during the predetermined time interval, so as to identify whether the state of the electronic device 101 requires an operation for prevention of the burn-in phenomenon.

In operation 1020, the at least one processor 120 may reduce the size of the at least one identified layer based on identifying the at least one layer. After reducing the size of the at least one layer, the at least one processor 120 may proceed with operation 630.

As described above, the electronic device 101 according to various embodiments may reduce the size of at least one layer, which maintains display during a predetermined time interval and may cause the burn-in phenomenon, and may move the at least one layer having the reduced size at predetermined intervals.

Figure 11:
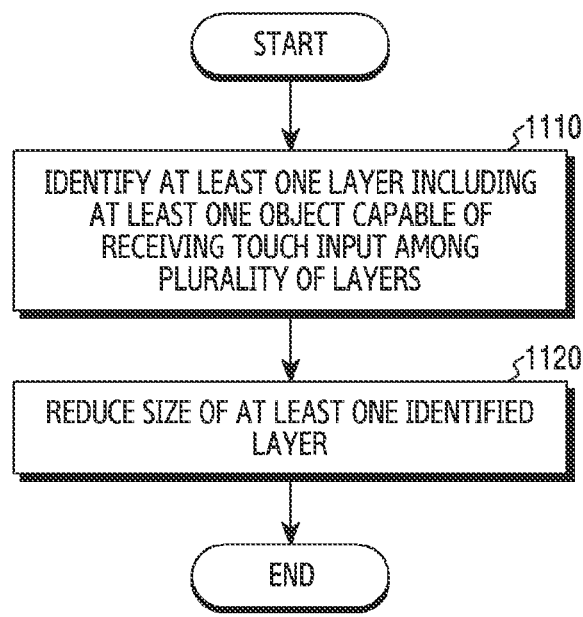
FIG. 11 is a diagram illustrating another example of an operation of reducing the size of at least one layer by an electronic device according to various embodiments.

FIG. 11 is a diagram illustrating another example of an operation of reducing the size of at least one layer by an electronic device according to various embodiments. The operation may be performed by the electronic device 101 of FIG. 1, the electronic device 101 of FIG. 3, or the at least one processor 120 of the electronic device 101.

Operations 1110 and 1120 of FIG. 11 may be related to operation 620 of FIG. 6.

Referring to FIG. 11, in operation 1110, the at least one processor 120 may identify at least one layer including at least one object capable of receiving a touch input among the plurality of layers. According to various embodiments, the at least one object may be an object for which touch coordinates are determined in order to receive a touch input. According to various embodiments, the at least one object may be an object that interoperates with a touch panel disposed on the display panel. According to various embodiments, the at least one object may be an object that maintains display until a touch input is received. For example, the at least one object may include a plurality of keys included in a virtual keyboard. According to various embodiments, the at least one object may be referred to as an item, an icon, and the like. According to various embodiments, the at least one processor 120 may identify the at least one layer that includes the at least one object among the plurality of layers of the user interface of the first application, in response to reception of an input for executing the first application among the plurality of applications.

In operation 1120, the at least one processor 120 may reduce the size of the at least one identified layer. After reducing the size of the at least one layer, the at least one processor 120 may proceed with operation 630.

As described above, the electronic device 101 according to various embodiments may identify the object type of an object included in each of the plurality of layers of the user interface of the application for which execution request is received, may reduce the size of at least one layer that may cause the burn-in phenomenon, and may move the at least one layer having the reduced size at predetermined intervals.

Figure 12:
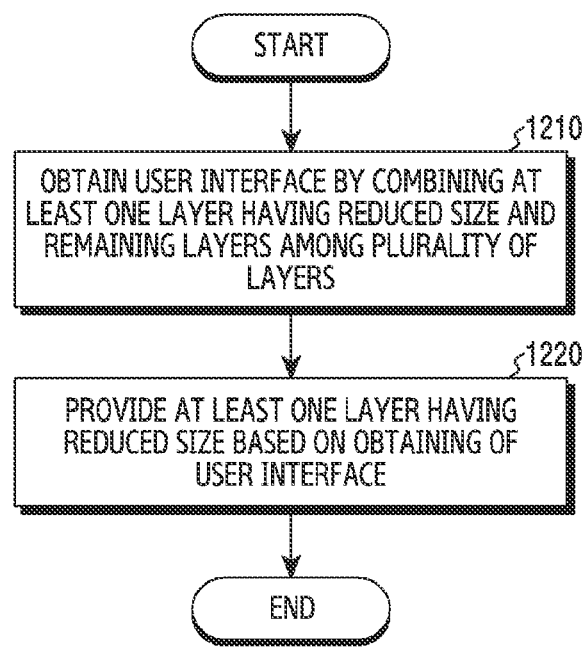
FIG. 12 is a diagram illustrating an example of an operation of providing at least one layer by an electronic device according to various embodiments.

FIG. 12 is a diagram illustrating an example of an operation of providing at least one layer by an electronic device according to various embodiments. The operation may be performed by the electronic device 101 of FIG. 1, the electronic device 101 of FIG. 3, or the at least one processor 120 of the electronic device 101.

Operations 1210 and 1220 of FIG. 12 may be related to operation 630 of FIG. 6.

Referring to FIG. 12, in operation 1210, the at least one processor 120 may obtain a user interface by combining at least one layer having a reduced size and the remaining layers among the plurality of layers. For example, the at least one processor 120 may reduce the size of the at least one layer, so as to produce the at least one layer having the reduced size. The at least one processor 120 may produce or obtain the user interface by combining the at least one layer having the reduced size and the layers remaining after excluding the at least one layer among the plurality of layers.

In operation 1220, the at least one processor 120 may provide the at least one layer having the reduced size in response to obtaining the user interface. For example, the at least one processor 120 may provide the user interface including the at least one layer having the reduced size via the combination, so as to provide the at least one layer having the reduced size.

Figure 13:
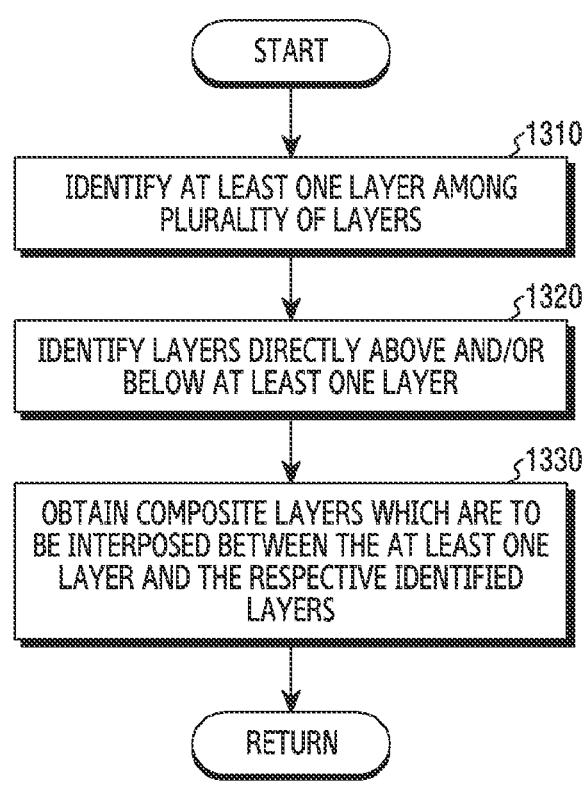
FIG. 13 is a diagram illustrating an example of an operation of producing a composite layer to be inserted into a user interface, by an electronic device according to various embodiments.

FIG. 13 is a diagram illustrating an example of an operation of producing a composite layer that is to be inserted into a user interface, by an electronic device according to various embodiments. The operation may be performed by the electronic device 101 of FIG. 1, the electronic device 101 of FIG. 3, or the at least one processor 120 of the electronic device 101.

Operations 1310 and 1330 of FIG. 13 may be related to operation 1210 of FIG. 12.

Referring to FIG. 13, in operation 1310, the at least one processor 120 may identify at least one layer among the plurality of layers. For example, the at least one processor 120 may identify the at least one layer via at least one of FIG. 7 to FIG. 11.

In operation 1320, the at least one processor 120 may identify a layer that is directly above the at least one layer and/or a layer directly below the at least one layer. For example, the at least one processor 120 may identify a layer that is directly above the at least one layer and/or a layer directly below the at least one layer in order to prevent the difference in color between the layers which may cause by reduction of the size of the at least one layer.

In operation 1330, the at least one processor 120 may obtain composite layers (composition layers) which are to be interposed between the at least one layer and the identified layers respectively. According to various embodiments, the color of each of the composite layers may be configured with at least one color used for reducing the difference between the color of the at least one layer and the color of each of the identified layers.

The at least one processor 120 may obtain each of the composite layers, and may insert each of the composite layers into the user interface obtained by combining the plurality of layers, or may combine the composite layers and the plurality of layers, so as to obtain the user interface.

As described above, the electronic deice 101 according to various embodiments may reduce, using the composite layer, the difference in color between layers which may be caused by reduction of the size of the at least one layer.

Figure 14:
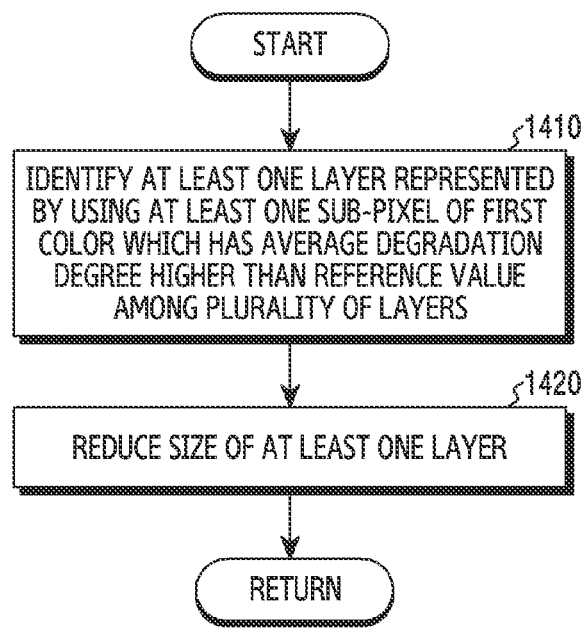
FIG. 14 is a diagram illustrating another example of an operation of reducing the size of at least one layer by an electronic device according to various embodiments.

FIG. 14 is a diagram illustrating another example of an operation of reducing the size of at least one layer by an electronic device according to various embodiments. The operation may be performed by the electronic device 101 of FIG. 1, the electronic device 101 of FIG. 3, or the at least one processor 120 of the electronic device 101.

Operations 1410 and 1420 of FIG. 14 may be related to operation 620 of FIG. 6.

Referring to FIG. 14, in operation 1410, the at least one processor 120 may identify at least one layer represented by at least one sub-pixel of a first color which has an average degradation degree higher than a reference value among the plurality of layers. For example, the at least one processor 120 may store information associated with the average degradation degree of each of the plurality of sub-pixels included in the display panel. According to various embodiments, the average degradation degree may be a parameter related to the life of each of the plurality of sub-pixels. According to various embodiments, the average degradation degree may be a parameter indicating the degree of degradation in the performance of each of the plurality of sub-pixels. According to various embodiments, the average degradation degree may be proportional to, or substantially proportional to, an accumulated usage time. Information associated with the average degradation degree may be identified based on at least one of the accumulated output value of each of the plurality of sub-pixels, the accumulated usage time of each of the plurality of sub-pixels, the accumulated average brightness of each of the plurality of sub-pixels, or the accumulated average temperature of each of the plurality of sub-pixels, which may be obtained based on the average output value of each of the plurality of sub-pixels obtained for each frame. According to various embodiments, the at least one processor 120 may refer to information associated with the average degradation degree of each of the plurality of sub-pixels in response to reception of an input for executing the first application among the plurality of applications, and may identify at least one layer represented by at least one sub-pixel of a first color which has an average degradation degree higher than a reference value among the plurality of layers.

In operation 1420, the at least one processor 120 may reduce the size of the at least one identified layer. After reducing the size of the at least one layer, the at least one processor 120 may proceed with operation 630.

As described above, the electronic device 101 according to various embodiments may store information associated with the average degradation degree of each of the plurality of pixels, may reduce the size of at least one layer represented via sub-pixels having a relatively high degradation degree among the plurality of sub-pixels, and may move the at least one layer having the reduced size at predetermined intervals.

Figure 15:
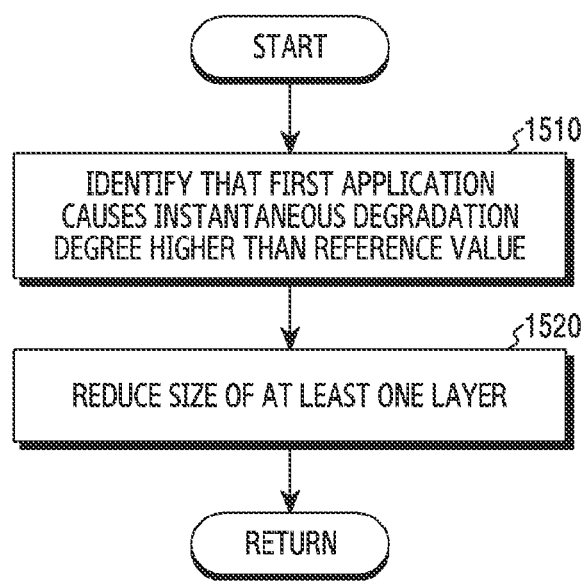
FIG. 15 is a diagram illustrating an example of an operation of identifying an application that needs to reduce the size of at least one layer among a plurality of applications, by an electronic device according to various embodiments.

FIG. 15 is a diagram illustrating an example of an operation of identifying an application which needs to reduce the size of at least one layer among a plurality of applications according to various embodiments. The operation may be performed by the electronic device 101 illustrated in FIG. 1, the electronic device 101 illustrated in FIG. 3, or at least one processor 120 included in the electronic device 101.

Operations 1510 and 1520 of FIG. 15 may be related to operation 620 of FIG. 6.

Referring to FIG. 15, in operation 1510, the at least one processor 120 may identify that the first application causes an instantaneous degradation degree higher than a reference value. For example, the at least one processor 120 may identify an instantaneous degradation degree of each of a plurality of sub-pixels included in the display panel while the user interface of each of the plurality of applications is displayed, every time that each of the plurality of applications is executed, and may store information associated with the identified instantaneous degradation degree. For example, the information associated with the instantaneous degradation degree may be obtained based on at least one of the average output value of each of the plurality of sub-pixels obtained for each frame, the ratio of used sub-pixels of the first color to the plurality of sub-pixels, and the time of usage of the sub-pixels of the first color among the plurality of sub-pixels. Based on reception of an input for executing the first application, the at least one processor 120 may identify the first application as an application having a high probability of causing the burn-in phenomenon, based at least on the information associated with the instantaneous degradation degree.

In operation 1520, the at least one processor 120 may reduce the size of the at least one layer based on the identification. For example, the at least one processor 120 may determine to reduce the size of at least one layer among a plurality of layers included in the user interface of the first application, and may reduce the size of the at least one layer.

As described above, the electronic device 101 according to various embodiments may control display of at least one layer configured in the user interface of an application having a high probability of causing the burn-in phenomenon among the plurality of applications stored in the electronic device 101.

Figure 16:
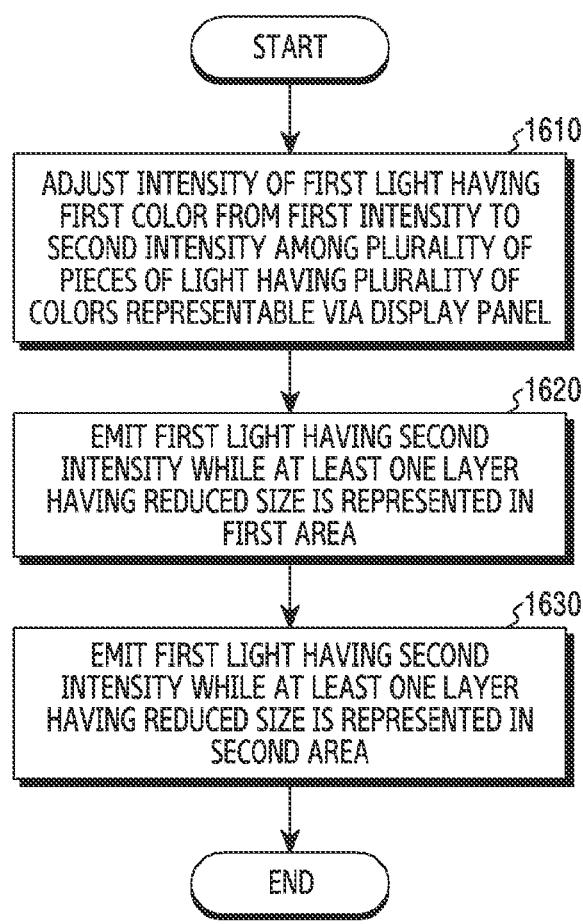
FIG. 16 is a diagram illustrating an example of operation of adjusting the intensity of at least one piece of light among a plurality of pieces of light having a plurality of colors representable via a display panel, by an electronic device according to various embodiments.

FIG. 16 is a diagram illustrating an example of operation of adjusting the intensity of at least one piece of light among a plurality of pieces of light having a plurality of colors representable via a display panel according to various embodiments. The operation may be performed by the electronic device 101 illustrated in FIG. 1, the electronic device 101 illustrated in FIG. 3, or the at least one processor 120 included in the electronic device 101.

Operations 1610 and 1630 of FIG. 16 may be related to operations 630 and 640 of FIG. 6.

Referring to FIG. 16, in operation 1610, the at least one processor 120 may adjust the intensity of a first light (e.g., blue light) having a first color (blue) from a first intensity to a second intensity among a plurality of pieces of light having plurality of colors (e.g., red light, green light, blue light, and the like) representable via a display panel. According to various embodiments, the first intensity may be the intensity of light defined in advance in order to provide the user interface of the first application. According to various embodiments, the first intensity may be an intensity corresponding to the brightness of a screen represented by the display panel at the timing at which the user input for executing the first application is received. According to various embodiments, the first intensity may be an intensity corresponding to the ambient illuminance of the electronic device 101 at the timing at which the user input for executing the first application is received. According to various embodiments, the second intensity may be an intensity lower than the first intensity. According to various embodiments, the adjustment to the second intensity may be performed by reducing the intensity of light emitted from each of the sub-pixels for representing the first color. According to various embodiments, the adjustment to the second intensity may be performed by inactivating a part of the sub-pixels for representing the first color.

In operation 1620, the at least one processor 120 may emit the first light having the second intensity while the at least one layer having the reduced size is represented in the first area. For example, the at least one processor 120 may emit the first light having the second intensity by reducing power provided to each of the sub-pixels for representing the first light while the at least one layer having the reduced size is represented in the first area. As another example, the at least one processor 120 may emit the first light having the second intensity by inactivating a part of the sub-pixels for representing the first light (e.g., sub-pixels disposed in an odd-numbered line or sub-pixels disposed in an even-numbered line) and providing normal power to the remaining sub-pixels for representing the first light, while the at least one layer having the reduced size is represented in the first area.

In operation 1630, the at least one processor 120 may emit the first light having the second intensity while the at least one layer having the reduced size is represented in the second area. For example, the at least one processor 120 may emit the first light having the second intensity by reducing power provided to each of the sub-pixels for representing the first light while the at least one layer having the reduced size is represented in the second area. As another example, the at least one processor 120 may emit the first light having the second intensity by inactivating a part of the sub-pixels for representing the first light (e.g., sub-pixels disposed in an odd-numbered line or sub-pixels disposed in an even-numbered line) and providing normal power to the remaining sub-pixels for representing the first light, while the at least one layer having the reduced size is provided in the second area. As another example, the processor 120 may change the combination of colors of the at least one layer, or may reduce the concentration of a predetermined color (e.g., blue color) among a plurality of colors included in the at least one layer. However, the disclosure is not limited thereto.

As described above, the electronic device 101 according to various embodiments may prevent the burn-in phenomenon from occurring in the electronic device 101, by controlling the intensity of light emitted from at least one sub-pixel of the sub-pixels included in the display panel.

Figure 17:
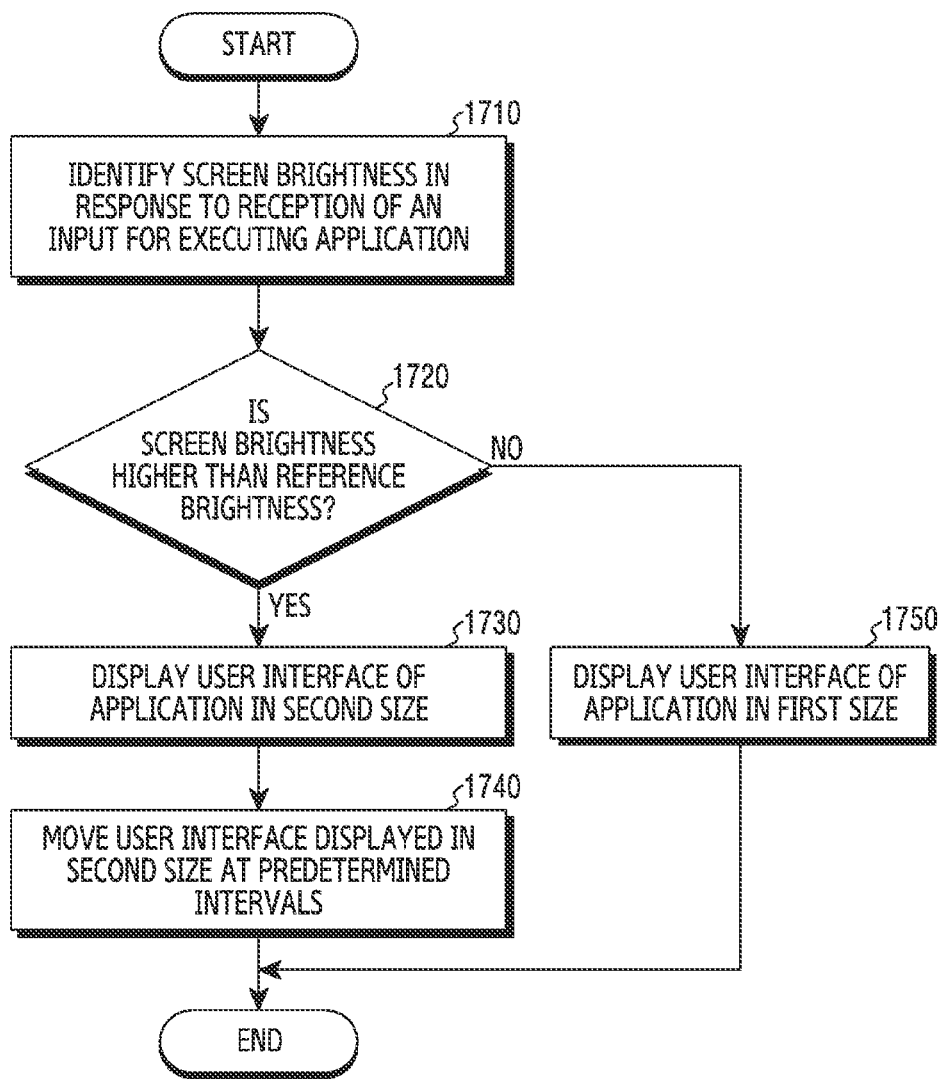
FIG. 17 is a diagram illustrating another example of operation of an electronic device according to various embodiments.

FIG. 17 is a diagram illustrating another example of operation of an electronic device according to various embodiments. The operation may be performed by the electronic device 101 illustrated in FIG. 1, the electronic device 101 illustrated in FIG. 3, or at least one processor 120 included in the electronic device 101.

In operation 1710, the at least one processor 120 may identify a screen brightness in response to reception of an input for executing an application. For example, the at least one processor 120 may identify a currently represented screen brightness in response to reception of the input, in order to identify whether the state of the electronic device 101 is in the state of causing the burn-in phenomenon in the display panel.

In operation 1720, the at least one processor 120 may identify whether the identified screen brightness is higher than a reference brightness. According to various embodiments, the reference brightness may be configured by the electronic device 101 in order to identify whether the screen brightness represented by the electronic device 101 is a brightness having a high probability of causing the burn-in phenomenon. According to various embodiments, the reference brightness may be configured as a fixed value, or may be configured as a variable value. According to various embodiments, if the reference brightness is configured as a variable value, the reference brightness may be changed based on a user input. Based on identifying that the identified screen brightness is higher than the reference brightness, the at least one processor 120 may proceed with operation 1730. Unlike the above, based on identifying that the identified brightness is lower than or equal to the reference brightness, the at least one processor 120 may proceed with operation 1750.

In operation 1730, the at least one processor 120 may display a user interface of the application in a second size, based on identifying that the identified screen brightness is higher than the reference brightness. The second size may be the size reduced from the first size that is the default size of the user interface of the application. According to various embodiments, the at least one processor 120 may display at least a part of the user interface of the application in the second size, based on identifying that the identified screen brightness is higher than the reference brightness.

In operation 1740, the at least one processor 120 may move the user interface displayed in the second size at predetermined intervals. For example, the at least one processor 120 may move the user interface displayed in the second size at predetermined intervals in order to prevent the burn-in phenomenon.

Although not illustrated in FIG. 17, the at least one processor 120 may identify that the screen brightness is changed while the user interface is represented in the second size. The at least one processor 120 may display the user interface in the first size which is changed (or restored) from the second size, in response to identifying that the screen brightness is changed. The change of the screen brightness may be identified by identifying that a value obtained from an illuminance sensor of the electronic device 101 is changed.

In operation 1750, the at least one processor 120 may display the user interface of the application in the first size, based on identifying that the identified screen brightness is lower than or equal to the reference brightness. If the identified screen brightness is lower than or equal to the reference brightness, the probability that the burn-in phenomenon will occur in the display panel of the electronic device is low, and thus, the at least one processor 120 may display the user interface of the application in the first size.

As described above, the electronic device 101 according to various embodiments may adaptively adjust the size of the displayed user interface based on the currently represented screen brightness, and may prevent the burn-in phenomenon from occurring in the display panel of the electronic device 101.

As described above, a method of operating an electronic device (e.g., the electronic device 101) may include: executing a predetermined application including a first application display layer configured to display fixed content and a second application display layer configured to display variable content; displaying, based at least on the fixed content, the first application display layer in a second predetermined size smaller than a first predetermined size corresponding to an active area of a display panel of the electronic device, while the predetermined application is executed; and at least temporarily moving the first application display layer displayed in the second predetermined size, within the active area.

According to various embodiments, the method may further include: displaying the second application display layer in the second predetermined size smaller than the first predetermined size, while the predetermined application is executed.

According to various embodiments, the operation of moving the first application display layer may include: moving the first application display layer within the active area at predetermined intervals, in response to identifying that a predetermined (specified) period of time elapses from the timing at which the first application display layer is displayed in the second predetermined size.

According to various embodiments, the operation of displaying the first application display layer in the second predetermined size may include: identifying that the brightness of the display panel is higher than a predetermined value in response to executing the predetermined application; and displaying the first application display layer in the second predetermined size, in response to identifying that the brightness of the display panel is higher than the predetermined value. According to various embodiments, the method may further include: identifying that the brightness of the display panel is lower than or equal to the predetermined value, in response to executing the predetermined application; and displaying the first application display layer in the first predetermined size, in response to identifying that the brightness of the display panel is lower than or equal to the predetermined value.

According to various embodiments, the method may further include: obtaining the illuminance value of an environment where the electronic device is located, using the illuminance sensor of the electronic device; and displaying the first application display layer in the second designated size, in response to identifying that the obtained illuminance value falls within a reference range.

According to various embodiments, the predetermined application may correspond to an application installed based on a user input, and the operation of displaying the first application display layer in the second predetermined size may include: displaying the first application display layer in the second predetermined size in response to executing the predetermined application among a plurality of applications stored in the electronic device.

According to various embodiments, the first application display layer may be configured with the fixed content that is continuously displayed until a user input is received.

According to various embodiments, the first application display layer may be configured to maintain display during a predetermined time interval.

According to various embodiments, the first application display layer may include at least one object capable of receiving a touch input via a touch panel of the electronic device.

According to various embodiments, the first application display layer may at least partially overlap with the second application display layer, when viewed from the top.

According to various embodiments, in response to the execution, the method may further include: adjusting the intensity of blue light to be emitted from the display panel from a first intensity to a second intensity that is lower than the first intensity, and controlling the display panel to emit the blue light having the second intensity while the first application layer is represented in the second predetermined size. According to various embodiments, the display panel of the electronic device may include pixels of a first group and pixels of a second group which are disposed alternately with each other. In response to the execution, the operation of adjusting may include: adjusting the intensity of the blue light from the first intensity to the second intensity by inactivating either a plurality of B-sub-pixels included in the pixels of the first group or a plurality of B-sub-pixels included in the pixels of the second group.

According to various embodiments, in response to identifying an input for executing the predetermined application, the method may further include an operation of producing a first composite layer which is to be interposed between the first application display layer and the second application display layer, and the first composite layer may be used to decrease the difference in color between the first application display layer and the second application display layer.

According to various embodiments, the method may further include: identifying the average degradation degree of each of B-sub-pixels included in the display panel every time that the predetermined application is executed. The operation of displaying the first application display layer in the second predetermined size may include: identifying the first application display layer represented using at least one B-sub-pixel having an average degradation degree higher than a reference value among the B-sub-pixels, and displaying the first application display layer in the second predetermined size based on the identification.

According to various embodiments, the range of the movement of the first application display layer may be within a predetermined distance from the initial location of the first application display layer.

A method of operating an electronic device according to various embodiments, as described above, may include: executing a predetermined application including a first application display layer configured to display fixed content and a second application display layer configured to display variable content; adjusting a display property corresponding to a predetermined color included in at least a part of the first application display layer based at least on the fixed content, while the predetermined application is executed; and displaying the fixed content included in the first application display layer of which the display property is adjusted and the variable content included in the second application display layer via the display panel.

According to various embodiments, the predetermined color may correspond to blue.

According to various embodiments, the display property may be the brightness or chroma of the predetermined color.

A method of operating an electronic device according to various embodiments, as described above, may include: receiving an input for executing a first application among a plurality of applications stored in the electronic device; reducing the size of at least one layer among a plurality of layers that are configured in a user interface of the first application, based at least on the reception; representing the at least one layer having the reduced size in a first area in a display area of the display; and moving the at least one layer among the plurality of layers in response to identifying that a predetermined (specified) period of time elapses from the timing at which the at least one layer is represented in the first area, so as to provide the at least one layer having the reduced size in a second area of the display area which partially overlaps with the first area.

According to various embodiments, the operation of reducing the size of the at least one layer may include: identifying that the brightness of the display panel is higher than a predetermined value (specified value) in response to the reception, and reducing the size of the at least one layer among the plurality of layers in response to identifying that the brightness of the display panel is higher than the predetermined value. According to various embodiments, the method may further include: identifying that the brightness of the display panel is lower than or equal to the predetermined value; and representing the at least one layer having a default size in the user interface in response to identifying that the brightness of the display panel is lower than or equal to the predetermined value.

According to various embodiments, the operation of reducing the size of the at least one layer may include: obtaining the illuminance value of an environment where the electronic device is located using an illuminance sensor of the electronic device; and reducing the size of the at least one layer among the plurality of layers in response to identifying that the obtained illuminance value falls within a reference range.

According to various embodiments, the operation of reducing the size of the at least one layer may include: identifying that the first application corresponds to an application installed based on a user input, in response to the reception; and reducing the size of the at least one layer among the plurality of layers configured in the user interface of the first application based on identifying that the first application corresponds to the application installed based on the user input.

According to various embodiments, the operation of reducing the size of the at least one layer may include: identifying the at least one layer that maintains display until a user input is received, from among the plurality of layers configured in the user interface of the first application, in response to the reception; and reducing the size of the at least one identified layer.

According to various embodiments, the operation of reducing the size of the at least one layer may include: identifying the at least one layer that maintains display during a predetermined time interval, from among the plurality of layers configured in the user interface of the first application, in response to the reception; and reducing the size of the at least one identified layer.

According to various embodiments, the operation of reducing the size of the at least one layer may include: identifying the at least one layer including at least one object capable of receiving a touch input via the touch panel from among the plurality of layers configured in the user interface of the first application, in response to the reception; and reducing the size of the at least one identified layer.

According to various embodiments, the operation of representing the at least one layer may include: combining the at least one layer having the reduced size and the remaining layers among the plurality of layers, so as to obtain the user interface; and representing the at least one layer having the reduced size in the first area based on obtaining of the user interface.

According to various embodiments, an area that represents the remaining layers among the plurality of layers may be maintained independently from the movement of the at least one layer. For example, when viewed from the top, the at least one layer may partially overlap with the remaining layers.

According to various embodiments, the method may include: based at least on the reception, adjusting the intensity of blue light to be emitted from the display panel from a first intensity to a second intensity that is lower than the first intensity; controlling the display panel to emit the blue light having the second intensity while the at least one layer having the reduced size is represented in the first area; and controlling the display panel to emit blue light having the second intensity while the at least one layer having the reduced size is represented in the second area. According to various embodiments, the display panel of the electronic device may include pixels of a first group and pixels of a second group which are disposed alternately (repeatedly) with each other. Based at least on the reception, the operation of adjusting may include: adjusting the intensity of the blue light from the first intensity to the second intensity that is lower than the first intensity by inactivating either a plurality of B-sub-pixels included in the pixels of the first group and a plurality of B-sub-pixels included in the pixels of the second group.

According to various embodiments, when the instructions are executed, the method may further include an operation of producing a first composite layer which is to be interposed between the at least one layer and a first layer that is directly above the at least one layer among the remaining layers, based at least on the reception, and the first composite layer may be used to decrease the difference in color between the at least one layer and the first layer.

According to various embodiments, the method may further include: identifying the average degradation degree (average of degree of degradation) of each of B-sub-pixels included in the display panel every time that the user interface of the first application is provided. The operation of reducing the size of the at least one layer may include: identifying the at least one layer represented using at least one B-sub-pixel having an average degradation degree higher than a reference value among the B-sub-pixels, from among the plurality of layers, and reducing the size of the at least one identified layer.

According to various embodiments, the method may further include: identifying the instantaneous degradation degree of each of the B-sub-pixels included in the display panel every time that the user interface of each of the plurality of applications is represented. The operation of reducing the size of the at least one layer may include: reducing the size of the at least one layer, based at least on the reception of the input for executing the first application having an instantaneous degradation degree higher than a reference value among the plurality of applications.

According to various embodiments, the operation of moving the at least one layer may include moving the at least one layer at predetermined intervals, within a predetermined distance from an edge of the at least one layer provided in the first area.

A method of operating an electronic device according to various embodiments, as described above, may include: identifying a screen brightness in response to receiving an input for executing an application; displaying a user interface of the application in a first size in response to identifying that the screen brightness is lower than or equal to a reference brightness; and displaying the user interface of the application in a second size smaller than the first size in response to identifying that the screen brightness is higher than the reference brightness, wherein the user interface displayed in the second size may be moved at predetermined intervals.

According to various embodiments, the method may further include: identifying that the screen brightness is changed while the user interface is displayed in the second size; and displaying the user interface in the first size which is changed from the second size in response to identifying that the screen brightness is changed while the user interface is displayed in the second size. According to various embodiments, the operation of identifying that the screen brightness is changed may include: identifying that the screen brightness is changed by identifying that a value obtained from an illuminance sensor of the electronic device is changed while the user interface is displayed in the second size.

A method of operating an electronic device according to various embodiments, as described above, may include: executing a predetermined application via a second display layer, which is configured to have a second predetermined size that is smaller than a first predetermined size corresponding to an active area of a display panel of the electronic device; displaying a first display layer having the first predetermined size in a predetermined color below the second display layer, based on the execution; and at least temporarily moving the second display layer configured to have the second predetermined size, within the first display layer.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. An electronic device comprising:
a display panel having an active area in a first predetermined size; and
a processor,
wherein the processor is configured to:
execute a predetermined application including a first application display layer configured to display fixed content and a second application display layer configured to display variable content;
display, while the predetermined application is executed, the first application display layer in a second predetermined size smaller than the first predetermined size by reducing a size of the first application display layer;
at least temporarily move the first application display layer displayed in the second predetermined size within the active area;
identify a brightness of the display panel, in response to executing the predetermined application;
display, while the predetermined application is executed, the first application display layer in the second predetermined size, based on identifying that the brightness of the display panel is greater than a predetermined value; and
display, while the predetermined application is executed, the first application display layer in the first predetermined size, based on identifying that the brightness of the display panel is less than or equal to the predetermined value.

2. The electronic device as claimed in claim 1, wherein the processor is configured to display the second application display layer in the second predetermined size smaller than the first predetermined size, while the predetermined application is executed.

3. The electronic device as claimed in claim 1, wherein the processor is configured to move the first application display layer within the active area, based on identifying that a predetermined period of time elapses from a timing at which the first application display layer is displayed in the second predetermined size.

4. The electronic device as claimed in claim 1, further comprising:
an illuminance sensor,
wherein the processor is configured to:
obtain an illuminance value of an environment where the electronic device is located, using the illuminance sensor; and
display the first application display layer in the second designated size, further based on identifying that the obtained illuminance value falls within a reference range.

5. The electronic device as claimed in claim 1, wherein the processor is configured to display the first application display layer in the second predetermined size, further based on executing an application installed based on a user input among a plurality of applications stored in the electronic device.

6. The electronic device as claimed in claim 1, wherein the first application display layer comprises content configured to be continuously displayed until a user input is received, as at least a part of the fixed content.

7. The electronic device as claimed in claim 1, wherein the first application display layer comprises content configured to be continuously displayed during a predetermined time interval, as at least a part of the fixed content.

8. The electronic device as claimed in claim 1, further comprising:
a touch panel disposed on the display panel,
wherein the first application display layer comprises at least one object capable of receiving a touch input via the touch panel.

9. The electronic device as claimed in claim 1, wherein the first application display layer partially overlaps with the second application display layer.

10. The electronic device as claimed in claim 1, wherein the processor is configured to move the first application display layer within a predetermined distance from an initial location of the first application display layer.

11. An electronic device comprising:
a display panel; and
a processor,
wherein the processor is configured to:
execute a predetermined application including a first application display layer configured to display fixed content, and a second application display layer configured to display variable content;
adjust a display property corresponding to a predetermined color included in at least a part of the first application display layer, based at least on the fixed content, while the predetermined application is executed; and
display the fixed content included in the first application display layer of which the display property is adjusted and the variable content included in the second application display layer, via the display panel.

12. The electronic device as claimed in claim 11, wherein the predetermined color corresponds to blue.

13. An electronic device comprising:
a memory storing instructions;
a display panel; and
at least one processor operatively coupled to the display panel and the memory,
wherein, when the instructions are executed, the at least one processor is configured to:
identify a screen brightness based on reception of an input for executing an application;
display a user interface of the application in a first size, based on identifying that the screen brightness is lower than or equal to a reference brightness; and
display the user interface of the application in a second size smaller than the first size, based on identifying that the screen brightness is higher than the reference brightness, and
wherein the user interface displayed in the second size is moved at predetermined intervals.

* * * * *